(12) United States Patent
Nakajima

(10) Patent No.: US 11,349,510 B2
(45) Date of Patent: May 31, 2022

(54) RADIO FREQUENCY FRONT END MODULE AND COMMUNICATION DEVICE

(71) Applicant: Murata Manufacturing Co., Ltd., Kyoto (JP)

(72) Inventor: Reiji Nakajima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/153,197

(22) Filed: Jan. 20, 2021

(65) Prior Publication Data
US 2021/0143847 A1 May 13, 2021

Related U.S. Application Data

(63) Continuation of application No. PCT/JP2019/033383, filed on Aug. 26, 2019.

(30) Foreign Application Priority Data

Sep. 11, 2018 (JP) .............................. JP2018-169630

(51) Int. Cl.
*H04B 1/04* (2006.01)
*H04B 1/00* (2006.01)

(52) U.S. Cl.
CPC .............. *H04B 1/04* (2013.01); *H04B 1/0067* (2013.01); *H04B 2001/0408* (2013.01)

(58) Field of Classification Search
CPC . H04B 1/04; H04B 1/0067; H04B 2001/0408
See application file for complete search history.

(56) References Cited

U.S. PATENT DOCUMENTS 9,642,103 B2 * 5/2017 Tanaka .................. H03F 1/0261
10,505,700 B1 * 12/2019 Lan ........................ H04B 1/525
(Continued)

FOREIGN PATENT DOCUMENTS

| JP | H11-150482 A | 6/1999 |
|----|--------------|--------|
| JP | 2017-017691 A | 1/2017 |

(Continued)

OTHER PUBLICATIONS

International Search Report for PCT/JP2019/033383 dated Nov. 19, 2019.
Written Opinion for PCT/JP2019/033383 dated Nov. 19, 2019.

*Primary Examiner* — Nguyen T Vo
(74) *Attorney, Agent, or Firm* — Pearne & Gordon LLP

(57) ABSTRACT

A radio frequency (RF) front end module is capable of simultaneously transmitting an RF signal of a first communication channel in a communication band (CB) to which communication channels are allocated and an RF signal of a second communication channel of the CB. The module includes a common terminal, a power amplifier to which RF signals of the first and second communication channels are simultaneously input, a multiplexer that has a transmission filter unit and a reception filter unit connected to the common terminal and treating a transmission bandwidth of the CB and a reception bandwidth of the CB, respectively, as a pass band, and a transmission filter arranged between an output terminal of the power amplifier and an input terminal of the transmission filter unit and treating a bandwidth including the transmission bandwidth as a pass band and a bandwidth including the reception bandwidth as an attenuation band.

7 Claims, 7 Drawing Sheets

(56) References Cited

U.S. PATENT DOCUMENTS

| | | | |
|---|---|---|---|
| 2009/0174622 A1* | 7/2009 | Kanou | H04B 1/48 |
| | | | 343/876 |
| 2014/0015568 A1* | 1/2014 | Shimamune | H03F 3/195 |
| | | | 327/103 |
| 2015/0236748 A1* | 8/2015 | Nobbe | H03F 3/21 |
| | | | 455/78 |
| 2015/0236798 A1* | 8/2015 | Nobbe | H03F 3/21 |
| | | | 370/278 |
| 2016/0044677 A1* | 2/2016 | King | H04B 1/40 |
| | | | 455/450 |
| 2016/0380652 A1* | 12/2016 | Anthony | H04B 1/0057 |
| | | | 375/295 |
| 2017/0302328 A1 | 10/2017 | Obiya et al. | |
| 2017/0338839 A1* | 11/2017 | Little | H04B 1/56 |
| 2018/0175894 A1* | 6/2018 | Utsunomiya | H04B 1/0475 |
| 2018/0248569 A1* | 8/2018 | Takenaka | H04B 1/50 |

FOREIGN PATENT DOCUMENTS

| | | |
|---|---|---|
| JP | 2018-019392 A | 2/2018 |
| JP | 2018-101856 A | 6/2018 |
| WO | 2016/117482 A1 | 7/2016 |

\* cited by examiner

RADIO FREQUENCY FRONT END MODULE AND COMMUNICATION DEVICE

CROSS REFERENCE TO RELATED APPLICATIONS

This is a continuation of International Application No. PCT/JP2019/033383 filed on Aug. 26, 2019 which claims priority from Japanese Patent Application No. 2018-169630 filed on Sep. 11, 2018. The contents of these applications are incorporated herein by reference in their entireties.

BACKGROUND OF THE DISCLOSURE

Field of the Disclosure

The present disclosure relates to a radio frequency front end module and a communication device that process radio frequency signals.

Description of the Related Art

A radio frequency front end module is desired that supports a carrier aggregation (CA) scheme for simultaneously transmitting and receiving radio frequency signals having different frequencies.

In (FIG. 2B of) Japanese Unexamined Patent Application Publication No. 2017-17691, a circuit configuration of an electronic system (a radio frequency front end module) having a first transmission circuit and a second transmission circuit is disclosed. Specifically, the first transmission circuit has a first power amplifier, a first antenna switch, a first band selection switch, and a plurality of first filters (duplexers). The first power amplifier amplifies a radio frequency signal in a frequency range (a first frequency bandwidth group). The first band selection switch is arranged in a first signal path connecting the first power amplifier to the first antenna switch. The plurality of first filters (duplexers) are connected to the first band selection switch. The second transmission circuit has a second power amplifier, a second antenna switch, a second band selection switch, and a plurality of second filters (duplexers). The second power amplifier amplifies a radio frequency signal in another frequency range (a second frequency bandwidth group). The second band selection switch is arranged in a second signal path connecting the second power amplifier to the second antenna switch. The plurality of second filters (duplexers) are connected to the second band selection switch. According to this, so-called uplink carrier aggregation can be realized, in which a first radio frequency transmission signal outputted from the first transmission circuit and a second radio frequency transmission signal outputted from the second transmission circuit are simultaneously transmitted.

In recent years, for example, as a preparatory stage in the transition from the 4th generation mobile communication system (4G) to the 5th generation mobile communication system (5G), a technology called non-standalone (NSA) for performing 5G communication using the 4G-Long Term Evolution (LTE) communication network has been developed. In NSA, in order to increase the amount of communication data, a technology called Dual Connectivity (DC) is being developed, through which radio frequency signals of two communication channels used with different communication standards (4G LTE and 5G New Radio (NR)) are simultaneously transmitted and received in the same communication band.

In addition to the above-described DC technology, in a case where in a communication band to which a plurality of communication channels are allocated, a radio frequency signal of a first communication channel of the communication band and a radio frequency signal of a second communication channel of the communication band are to be simultaneously transmitted, intermodulation distortion is caused by a nonlinear element such as a power amplifier, the first and second communication channels differing in frequency. In a case where the frequency of an unwanted signal due to this intermodulation distortion is included in a reception bandwidth, there is a problem in that the reception sensitivity of the radio frequency front end module decreases.

BRIEF SUMMARY OF THE DISCLOSURE

The present disclosure has been made to solve the above-described problem, and it is an object of the present disclosure to provide a radio frequency front end module and a communication device that suppress the degradation of reception sensitivity due to intermodulation distortion caused by radio frequency signals of different communication channels in the same communication band.

According to preferred embodiments of the present disclosure, a radio frequency front end module capable of simultaneously transmitting a radio frequency signal of a first communication channel in a communication band to which a plurality of communication channels are allocated and a radio frequency signal of a second communication channel differing from the first communication channel in frequency in the communication band includes a common terminal, a power amplifier to which a radio frequency signal of the first communication channel and a radio frequency signal of the second communication channel are simultaneously input, a multiplexer that has a transmission filter unit connected to the common terminal and treating a transmission bandwidth of the communication band as a pass band and a reception filter unit connected to the common terminal and treating a reception bandwidth of the communication band as a pass band, and a transmission filter that is arranged between an output terminal of the power amplifier and an input terminal of the transmission filter unit and that treats a bandwidth including the transmission bandwidth as a pass band and a bandwidth including the reception bandwidth as an attenuation band.

According to preferred embodiments of the present disclosure, a radio frequency front end module and a communication device can be provided that suppress the degradation of reception sensitivity due to intermodulation distortion caused by radio frequency signals of different communication channels in the same communication band.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

Figure 1:
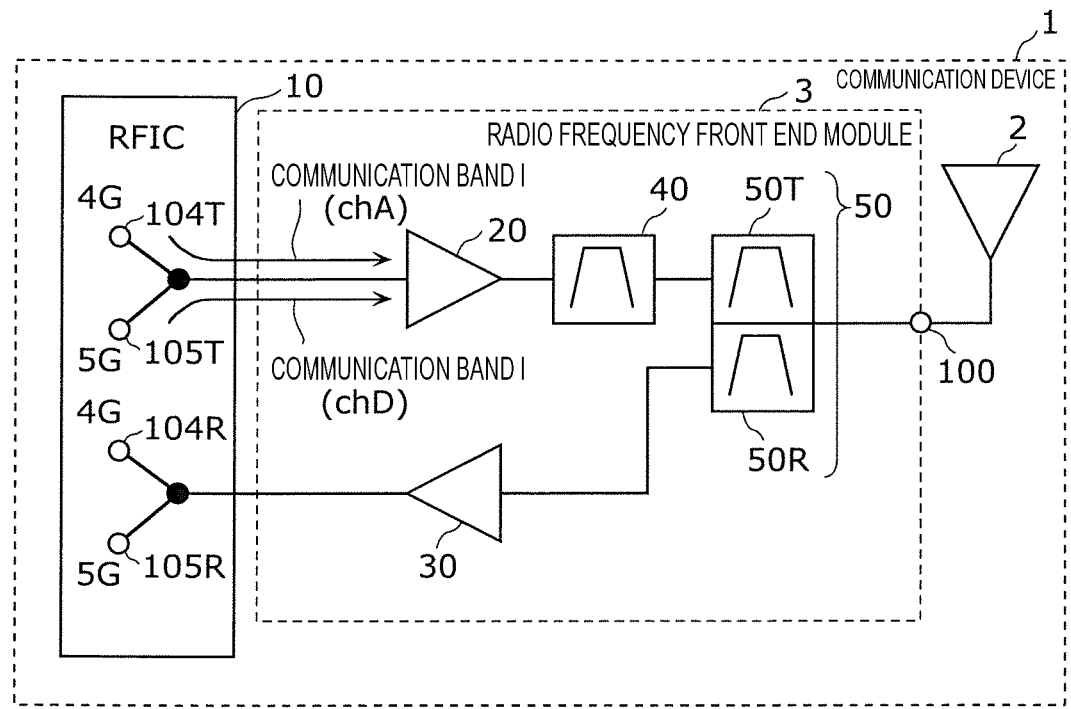
FIG. 1 is a circuit configuration diagram of a communication device according to a first embodiment.

In the following, embodiments of the present disclosure will be described in detail using the drawings. Note that the embodiments described below each illustrates a general or specific example. The numerical values, shapes, materials, structural elements, and arrangement and connection forms of the structural elements described in the following embodiments are examples, and they are not intended to limit the present disclosure. Among the structural elements in the following embodiments, the structural elements that are not described in independent claims are described as arbitrary structural elements. In addition, the structural elements in the drawings are not strictly illustrated in size or size ratio.

First Embodiment 1.1 Configuration of Radio Frequency Front End Module and Communication Device FIG. 1 is a circuit configuration diagram of a communication device 1 according to a first embodiment. As illustrated in FIG. 1, the communication device 1 includes a radio frequency front end module 3, an antenna circuit 2, and a radio frequency (RF) signal processing circuit (RFIC) 10.

The RFIC 10 is an RF signal processing circuit that processes radio frequency signals to be transmitted and received by the antenna circuit 2. The RFIC 10 performs signal processing such as downconversion on a radio frequency reception signal inputted via a reception signal path of the radio frequency front end module 3 and outputs a reception signal generated through the signal processing to a baseband signal processing circuit (baseband integrated circuit (BBIC): not illustrated). Moreover, the RFIC 10 performs signal processing such as upconversion on a transmission signal inputted from the BBIC and outputs a radio frequency transmission signal generated through the signal processing into a transmission signal path of the radio frequency front end module 3.

In particular, in a communication band to which a plurality of communication channels are allocated, the RFIC 10 can simultaneously output, to the radio frequency front end module 3, a radio frequency signal of a first communication channel of the communication band and a radio frequency signal of a second communication channel of the communication band, the first and second communication channels differing in frequency.

In the present embodiment, the RFIC 10 has a terminal 104T for transmitting a radio frequency signal used in the 4th generation mobile communication system (4G) and a terminal 105T for transmitting a radio frequency signal used in the 5th generation mobile communication system (5G). The RFIC 10 simultaneously transmits, for example, a radio frequency signal of the first communication channel, which is used as a 4G signal, and a radio frequency signal of the second communication channel, which is used as a 5G signal, to the radio frequency front end module 3. In addition, the RFIC 10 has a terminal 104R for receiving a radio frequency signal used in 4G and a terminal 105R for receiving a radio frequency signal used in 5G. The RFIC 10 simultaneously receives, for example, a radio frequency signal of the first communication channel, which is used as a 4G signal, and a radio frequency signal of the second communication channel, which is used as a 5G signal, from the radio frequency front end module 3.

Note that the RFIC 10 does not have to simultaneously transmit and receive a 4G radio frequency signal and a 5G radio frequency signal. The RFIC 10 may simultaneously transmit and receive, for example, radio frequency signals of the same mobile communication system (for example, two 5G radio frequency signals) through different communication channels. Moreover, the RFIC 10 does not have to simultaneously receive radio frequency signals of two different communication channels.

The BBIC is a circuit that performs signal processing using an intermediate frequency bandwidth having lower frequencies than a radio frequency signal propagating in the radio frequency front end module 3. The signal processed by the BBIC is used, for example, as an image signal for image display or as an audio signal for a phone conversation through a speaker.

In addition, the RFIC 10 also has a function as a controller that controls, in accordance with a communication band (frequency bandwidth) to be used, the connection of a switching circuit (illustrated in FIGS. 2 and 4 to 7) included in modifications of the radio frequency front end module 3. Specifically, the RFIC 10 uses a control signal (not illustrated) to switch connection of the switching circuit included in each modification of the radio frequency front end module 3. Note that the controller may be provided outside the RFIC 10, and may be provided in, for example, the radio frequency front end module 3 or the BBIC.

The antenna circuit 2 is connected to a common antenna terminal 100 of the radio frequency front end module 3 and simultaneously transmits and simultaneously receives, for example, a radio frequency signal of a channel A of a communication band I and a radio frequency signal of a channel D of the communication band I.

Note that the antenna circuit 2 and the BBIC are not essential structural elements in the communication device 1 according to the present embodiment.

Next, the configuration of the radio frequency front end module 3 will be described.

As illustrated in FIG. 1, the radio frequency front end module 3 includes the common antenna terminal 100, a transmission amplifier 20, a reception amplifier 30, a transmission filter 40, and a duplexer 50.

The duplexer 50 is a multiplexer including a transmission filter unit 50T and a reception filter unit 50R. The transmission filter unit 50T treats a transmission bandwidth of a communication band (the communication band I) as a pass band, and the reception filter unit 50R treats a reception bandwidth of the communication band (the communication band I) as a pass band.

The common antenna terminal 100 is connected to the antenna circuit 2 and a common terminal of the duplexer 50. To the common terminal of the duplexer 50, an output terminal of the transmission filter unit 50T and an input terminal of the reception filter unit 50R are connected.

The transmission amplifier 20 is a power amplifier that amplifies a radio frequency signal. Among a plurality of communication channels allocated to the same communication band, a radio frequency signal of the first communication channel and a radio frequency signal of the second communication channel are simultaneously inputted to the transmission amplifier 20. In the present embodiment, for example, a radio frequency signal of the channel A (the first communication channel) of the communication band I and a radio frequency signal of the channel D (the second communication channel) of the communication band I are simultaneously inputted to the transmission amplifier 20 from the RFIC 10. The transmission amplifier 20 amplifies each of the simultaneously inputted radio frequency signals of the channels A and D and outputs the resulting signals toward the transmission filter 40.

The reception amplifier 30 is a low-noise amplifier that amplifies a radio frequency signal so as to have low noise. A radio frequency signal of the first communication channel and a radio frequency signal of the second communication channel are simultaneously inputted to the reception amplifier 30. In the present embodiment, for example, a radio frequency signal of the channel A (the first communication channel) of the communication band I and a radio frequency signal of the channel D (the second communication channel) of the communication band I are simultaneously inputted to the reception amplifier 30 from the antenna circuit 2 via the reception filter unit 50R. The reception amplifier 30 amplifies each of the simultaneously inputted radio frequency signals of the channels A and D and outputs the resulting signals to the terminals 104R and 105R of the RFIC 10.

The transmission filter 40 is arranged between the transmission amplifier 20 and the transmission filter unit 50T and is a filter that treats a bandwidth including a transmission bandwidth of a communication band (the communication band I) as a pass band and treats a bandwidth including a reception bandwidth of the communication band (the communication band I) as an attenuation band.

Note that the transmission bandwidth of the communication band is a transmission bandwidth of a communication band determined in accordance with the Third Generation Partnership Project (3GPP) standards, and the reception bandwidth of the communication band is a reception bandwidth of a communication band determined in accordance with the 3GPP standards.

With the configuration described above, the radio frequency front end module 3 can simultaneously transmit and receive radio frequency signals of two different channels of the communication band (the communication band I), to which a plurality of communication channels are allocated.

In the radio frequency front end module 3 and the communication device 1 according to the present embodiment, for example, Band 71 (a transmission bandwidth: 663-698 MHz, a reception bandwidth: 617-652 MHz) for Long Term Evolution (LTE) is applied as the communication band I. Moreover, Channel A of Band 71 (a transmission channel: 663-668 MHz, a reception channel: 617-622 MHz) is applied as the channel A, and Channel D of Band 71 (a transmission channel: 678-683 MHz, a reception channel: 632-637 MHz) is applied as the channel D. In this case, when a radio frequency transmission signal $T_XA$ of Channel A of Band 71 (the center frequency: 665.5 MHz) and a radio frequency transmission signal $T_XB$ of Channel D of Band 71 (the center frequency: 680.5 MHz) are simultaneously inputted to the transmission amplifier 20, intermodulation distortion is caused by the two radio frequency transmission signals. Here, the frequency of the fifth order intermodulation distortion ($3 \times f_{TXA} - 2 \times f_{TXB}$) is 635.5 MHz and is included in the reception bandwidth (617-652 MHz) of Band 71.

As described above, in a case where radio frequency signals of two different communication channels (for example, the channels A and D) of the same communication band I are simultaneously transmitted, the frequency of intermodulation distortion occurring in the transmission amplifier 20 may be included in the reception bandwidth of the communication band I. In this case, unwanted signals due to the intermodulation distortion are not sufficiently attenuated by the transmission filter unit 50T, pass through the reception filter unit 50R, are amplified by the reception amplifier 30, and are received by the RFIC 10, which is expected to reduce the reception sensitivity.

In contrast to this, with the configuration described above, unwanted signals due to the intermodulation distortion occurring in the transmission amplifier 20 are attenuated by the transmission filter 40 before entering the duplexer 50, and thus are sufficiently attenuated upon passing through the transmission filter unit 50T. Thus, with the radio frequency front end module 3 and the communication device 1 according to the present embodiment, even in a case where radio frequency signals of two different communication channels (for example, the channels A and D) of the same communication band I are simultaneously transmitted, a decrease in the reception sensitivity can be suppressed. In addition, there is no need to limit a combination of two communication channels through which simultaneous transmission is performed and transmission power in order to prevent a decrease in the reception sensitivity, and thus the degree of flexibility in carrier aggregation (CA) is improved.

Note that radio frequency signals of the two different channels of the communication band I that are to be simultaneously transmitted may be used with different communication standards from each other.

According to this, in a case where radio frequency signals of two channels used with different communication standards are simultaneously transmitted, a decrease in the reception sensitivity can be suppressed without limiting a combination of two channels through which simultaneous transmission is performed and transmission power.

Moreover, in the present embodiment, radio frequency signals of the channel A are used in 4G, radio frequency signals of the channel D are used in 5G, and a radio frequency signal of the channel A and a radio frequency signal of the channel D are simultaneously transmitted using Dual Connectivity (DC).

In recent years, for example, as a preparatory stage in the transition from 4G to 5G, a technology called non-standalone (NSA) for performing 5G communication using the 4G-LTE communication network has been developed. In NSA, in order to increase the amount of communication data, a DC technology is being developed through which radio frequency signals of two communication channels used with different communication standards (4G LTE and 5G New Radio (NR)) are simultaneously transmitted and received in the same communication band.

In a case where the radio frequency front end module 3 and the communication device 1 according to the present embodiment are applied in DC for 4G and 5G, for example, 4G-LTE Band 71 and 5G-NR n71 are applied as the communication band I. Moreover, a first channel of 4G-LTE Band 71 is applied as the channel A, and a second channel of 5G-NR n71 is applied as the channel D.

With this configuration, even in a case where 4G and 5G radio frequency signals are simultaneously transmitted, a decrease in the reception sensitivity can be suppressed. In addition, there is no need to limit a combination of two communication channels through which simultaneous transmission is performed and transmission power in order to prevent a decrease in the reception sensitivity, and thus the degree of flexibility in DC is improved.

In addition to the DC technology described above, in a case where, for example, a radio frequency signal of the channel A of the communication band I, to which a plurality of communication channels are allocated, and a radio frequency signal of the channel D of the communication band I are to be simultaneously transmitted, intermodulation distortion is caused by a nonlinear element such as the transmission amplifier 20, the channel D differing from the channel A in frequency. This intermodulation distortion causes an unwanted signal, and in a case where the frequency of the unwanted signal is included in the reception bandwidth, there is a problem in that the reception sensitivity of a radio frequency front end module decreases.

In contrast to this, with the radio frequency front end module 3 according to the present embodiment, even in a case where simultaneous transmission is performed using the DC technology for 4G and 5G, a decrease in the reception sensitivity can be suppressed without limiting a combination of two communication channels through which simultaneous transmission is performed and transmission power.

Figure 2:
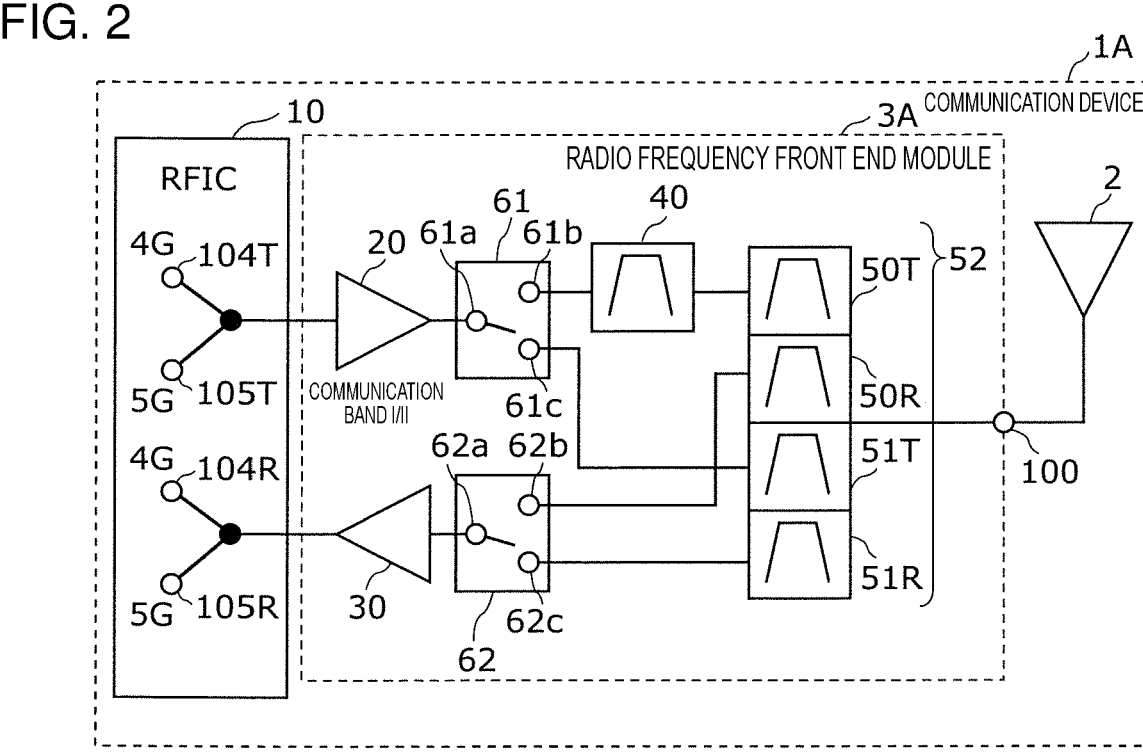
FIG. 2 is a circuit configuration diagram of a communication device according to a first modification of the first embodiment.

1.2 Configuration of Radio Frequency Front End Module and Communication Device According to First Modification FIG. 2 is a circuit configuration diagram of a communication device 1A according to a first modification of the first embodiment. As illustrated in FIG. 2, the communication device 1A includes a radio frequency front end module 3A, the antenna circuit 2, and the RFIC 10. When the communication device 1A according to the present modification is compared with the communication device 1 according to the first embodiment, the radio frequency front end modules 3 and 3A differ in configuration. More specifically, the radio frequency front end module 3A differs from the radio frequency front end module 3 in that a quadplexer 52 for the communication band I and a communication band II is arranged instead of the duplexer 50 for the communication band I and that switches 61 and 62 are arranged. In the following, regarding the communication device 1A according to the present modification, the description of the same configuration as that of the communication device 1 according to the first embodiment will be omitted and different configurations will be mainly described.

The RFIC 10 has the terminal 104T, through which a radio frequency signal used in 4G is transmitted, and the terminal 105T, through which a radio frequency signal used in 5G is transmitted. The RFIC 10 simultaneously transmits, for example, a radio frequency signal of the channel A of the communication band I used as a 4G signal and a radio frequency signal of the channel D of the communication band I used as a 5G signal to the radio frequency front end module 3A. In addition, the RFIC 10 has the terminal 104R, through which a radio frequency signal used in 4G is received, and the terminal 105R, through which a radio frequency signal used in 5G is received. The RFIC 10 simultaneously receives, for example, a radio frequency signal of the channel A of the communication band I used as a 4G signal and a radio frequency signal of the channel D of the communication band I used as a 5G signal from the radio frequency front end module 3A.

Furthermore, the RFIC 10 transmits a radio frequency signal of the communication band II to the radio frequency front end module 3A and receives a radio frequency signal of the communication band II from the radio frequency front end module 3A.

In addition, the RFIC 10 also has a function as a controller that controls, in accordance with a communication band to be used, the connection of the switches 61 and 62 included in the radio frequency front end module 3A.

The antenna circuit 2 is connected to the common antenna terminal 100 of the radio frequency front end module 3A and simultaneously emits and transmits and simultaneously receives, for example, a radio frequency signal of the channel A of the communication band I and a radio frequency signal of the channel D of the communication band I. Furthermore, the antenna circuit 2 emits and transmits and receives a radio frequency signal of the communication band II.

Next, the configuration of the radio frequency front end module 3A will be described.

As illustrated in FIG. 2, the radio frequency front end module 3A includes the common antenna terminal 100, the transmission amplifier 20, the reception amplifier 30, the transmission filter 40, the quadplexer 52, and the switches 61 and 62.

The quadplexer 52 is a multiplexer including the transmission filter unit 50T, a transmission filter unit 51T, the reception filter unit 50R, and a reception filter unit 51R. The transmission filter unit 50T treats the transmission bandwidth of the communication band I as a pass band, and the reception filter unit 50R treats the reception bandwidth of the communication band I as a pass band. Moreover, the transmission filter unit 51T treats a transmission bandwidth of the communication band II as a pass band, and the reception filter unit 51R treats a reception bandwidth of the communication band II as a pass band.

The common antenna terminal 100 is connected to the antenna circuit 2, the output terminals of the transmission filter units 50T and 51T, and the input terminals of the reception filter units 50R and 51R.

The transmission amplifier 20 is a power amplifier that amplifies a radio frequency signal. Among the plurality of communication channels allocated to the communication band I, for example, a radio frequency signal of the channel A and a radio frequency signal of the channel D are simultaneously inputted to the transmission amplifier 20. In addition, a radio frequency signal of the communication band II is inputted to the transmission amplifier 20. The transmission amplifier 20 amplifies each of the simultaneously inputted radio frequency signals of the channels A and D of the communication band I and outputs the resulting signals toward an input terminal of the transmission filter 40. Moreover, the transmission amplifier 20 amplifies the inputted radio frequency signal of the communication band II and outputs the resulting signal toward the input terminal of the transmission filter 40.

The reception amplifier 30 is a low-noise amplifier that amplifies a radio frequency signal so as to have low noise. For example, a radio frequency signal of the channel A of the communication band I and a radio frequency signal of the channel D of the communication band I are simultaneously inputted to the reception amplifier 30. In addition, a radio frequency signal of the communication band II is inputted to the reception amplifier 30. The reception amplifier 30 amplifies each of the simultaneously inputted radio frequency signals of the channels A and D of the communication band I and outputs the resulting signals to the terminals 104R and 105R of the RFIC 10. Moreover, the reception amplifier 30 amplifies the inputted radio frequency signal of the communication band II and outputs the resulting signal to the RFIC 10.

The transmission filter 40 is arranged between an output terminal of the transmission amplifier 20 and an input terminal of the transmission filter unit 50T and is a filter that treats a bandwidth including a transmission bandwidth of a communication band (the communication band I) as a pass band and treats a bandwidth including a reception bandwidth of the communication band (the communication band I) as an attenuation band.

The switch 61 has a common terminal 61a and selection terminals 61b and 61c. The common terminal 61a is connected to the output terminal of the transmission amplifier 20, the selection terminal 61b is connected to the input terminal of the transmission filter 40, and the selection terminal 61c is connected to an input terminal of the transmission filter unit 51T. With this configuration, the switch 61 switches between the connection of the transmission amplifier 20 to the transmission filter unit 50T and the connection of the transmission amplifier 20 to the transmission filter unit 51T.

The switch 62 has a common terminal 62a and selection terminals 62b and 62c. The common terminal 62a is connected to an input terminal of the reception amplifier 30, the selection terminal 62b is connected to an output terminal of the reception filter unit 50R, and the selection terminal 62c is connected to an output terminal of the reception filter unit 51R. With this configuration, the switch 62 switches between the connection of the reception amplifier 30 to the reception filter unit 50R and the connection of the reception amplifier 30 to the reception filter unit 51R.

With the configuration described above, the radio frequency front end module 3A can simultaneously transmit, for example, a radio frequency signal of the channel A and a radio frequency signal of the channel D in the communication band I, to which the plurality of communication channels are allocated. Moreover, by performing switching at the switches 61 and 62, the radio frequency front end module 3A can transmit and receive a radio frequency signal of the communication band II.

With the radio frequency front end module 3A and the communication device 1A according to the present modification, even in a case where radio frequency signals of two different communication channels (for example, the channels A and D) of the communication band I are simultaneously transmitted, a decrease in the reception sensitivity can be suppressed. In addition, for transmission and reception, the communication band I and the communication band II can be switched, and thus the radio frequency front end module 3A and the communication device 1A, which support multiple bands, can be provided.

Figure 3:
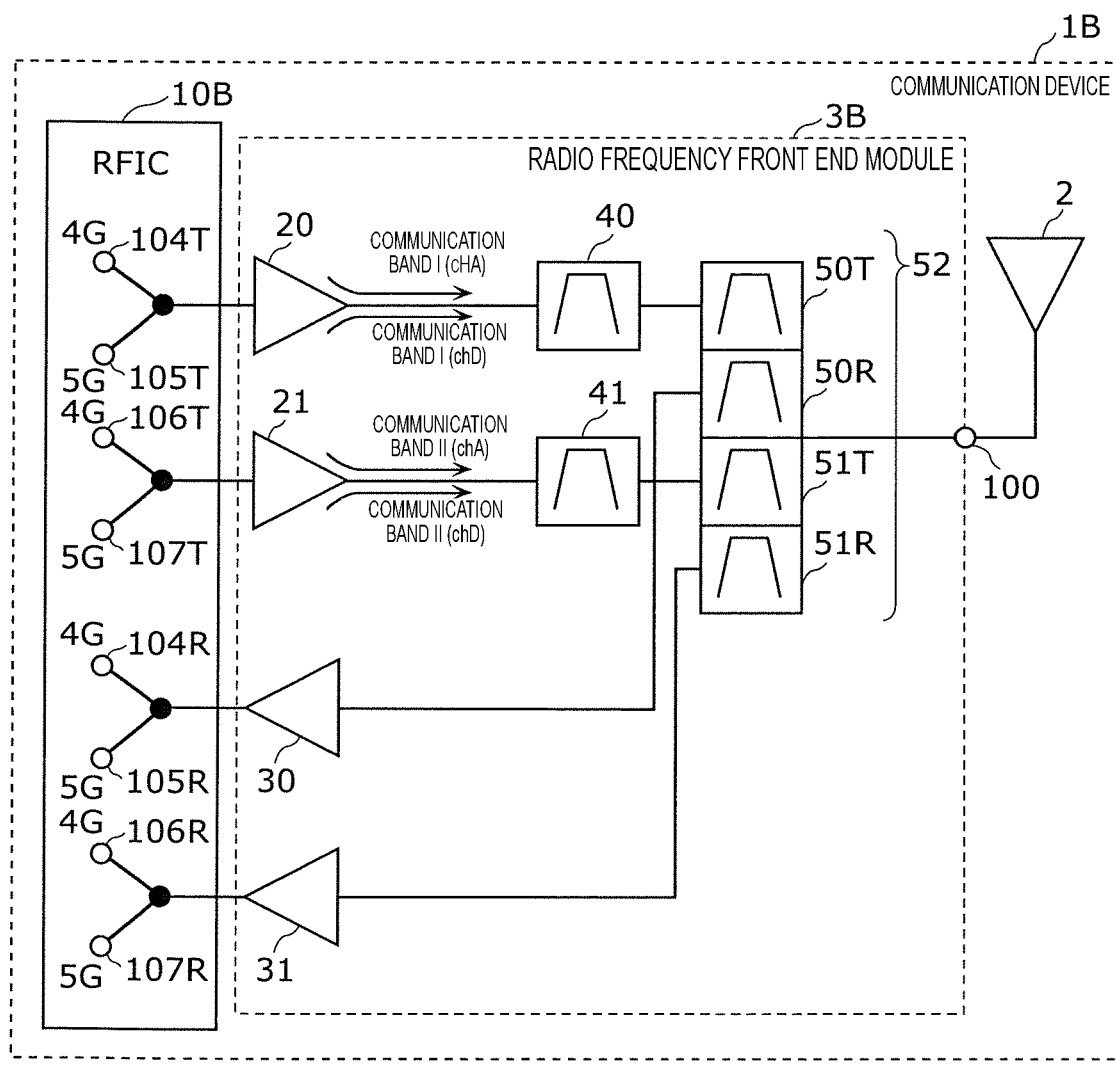
FIG. 3 is a circuit configuration diagram of a communication device according to a second modification of the first embodiment.

1.3 Configuration of Radio Frequency Front End Module and Communication Device According to Second Modification FIG. 3 is a circuit configuration diagram of a communication device 1B according to a second modification of the first embodiment. As illustrated in FIG. 3, the communication device 1B includes a radio frequency front end module 3B, the antenna circuit 2, and an RFIC 10B. When the communication device 1B according to the present modification is compared with the communication device 1A according to the first modification, the radio frequency front end module 3B and the RFIC 10B differ from the radio frequency front end module 3A and the RFIC 10 in configuration. More specifically, the radio frequency front end module 3B differs from the radio frequency front end module 3A in that a transmission amplifier and a reception amplifier are arranged for each communication band and that a transmission filter 41 is arranged also in a signal path for the communication band II. Moreover, the RFIC 10B differs from the RFIC 10 in that a 4G terminal and a 5G terminal are also arranged for the communication band II. In the following, regarding the communication device 1B according to the present modification, the description of the same configuration as that of the communication device 1A according to the first modification will be omitted and different configurations will be mainly described.

The RFIC 10B has the terminal 104T, through which a radio frequency signal of the communication band I used in 4G is transmitted, and the terminal 105T, through which a radio frequency signal of the communication band I used in 5G is transmitted. The RFIC 10B also has a terminal 106T for transmitting a radio frequency signal of the communication band II used in 4G and a terminal 107T for transmitting a radio frequency signal of the communication band II used in 5G. The RFIC 10B simultaneously transmits, for example, a radio frequency signal of the channel A of the communication band I used as a 4G signal and a radio frequency signal of the channel D of the communication band I used as a 5G signal to the radio frequency front end module 3B, and simultaneously transmits, for example, a radio frequency signal of a channel A of the communication band II used as a 4G signal and a radio frequency signal of a channel D of the communication band II used as a 5G signal to the radio frequency front end module 3B.

Moreover, the RFIC 10B has the terminal 104R, through which a radio frequency signal of the communication band I used in 4G is received, and the terminal 105R, through which a radio frequency signal of the communication band I used in 5G is received. The RFIC 10B also has a terminal 106R for receiving a radio frequency signal of the communication band II used in 4G and a terminal 107R for receiving a radio frequency signal of the communication band II used in 5G. The RFIC 10B simultaneously receives, for example, a radio frequency signal of the channel A of the communication band I used as a 4G signal and a radio frequency signal of the channel D of the communication band I used as a 5G signal from the radio frequency front end module 3B, and simultaneously receives, for example, a radio frequency signal of the channel A of the communication band II used as a 4G signal and a radio frequency signal of the channel D of the communication band II used as a 5G signal from the radio frequency front end module 3B.

The antenna circuit 2 is connected to the common antenna terminal 100 of the radio frequency front end module 3B and simultaneously emits and transmits and simultaneously receives, for example, a radio frequency signal of the channel A of the communication band I and a radio frequency signal of the channel D of the communication band I. Furthermore, the antenna circuit 2 simultaneously emits and transmits and simultaneously receives, for example, a radio frequency signal of the channel A of the communication band II and a radio frequency signal of the channel D of the communication band II.

Next, the configuration of the radio frequency front end module 3B will be described.

As illustrated in FIG. 3, the radio frequency front end module 3B includes the common antenna terminal 100, the transmission amplifier 20, a transmission amplifier 21, the reception amplifier 30, a reception amplifier 31, the transmission filters 40 and 41, and the quadplexer 52.

The transmission amplifier 20 is a power amplifier that amplifies a radio frequency signal. Among the plurality of communication channels allocated to the communication band I, for example, a radio frequency signal of the channel A and a radio frequency signal of the channel D are simultaneously inputted to the transmission amplifier 20. The transmission amplifier 20 amplifies each of the simultaneously inputted radio frequency signals of the channels A and D of the communication band I and outputs the resulting signals toward the input terminal of the transmission filter 40.

The transmission amplifier 21 is a power amplifier that amplifies a radio frequency signal. Among a plurality of communication channels allocated to the communication band II, for example, a radio frequency signal of the channel A and a radio frequency signal of the channel D are simultaneously inputted to the transmission amplifier 21. The transmission amplifier 21 amplifies each of the simultaneously inputted radio frequency signals of the channels A and D of the communication band II and outputs the resulting signals toward an input terminal of the transmission filter 41.

The reception amplifier 30 is a low-noise amplifier that amplifies a radio frequency signal so as to have low noise. A radio frequency signal of the channel A of the communication band I and a radio frequency signal of the channel D of the communication band I are simultaneously inputted to the reception amplifier 30. The reception amplifier 30 amplifies each of the simultaneously inputted radio frequency signals of the channels A and D of the communication band I and outputs the resulting signals to the terminals 104R and 105R of the RFIC 10B.

The reception amplifier 31 is a low-noise amplifier that amplifies a radio frequency signal so as to have low noise. For example, a radio frequency signal of the channel A of the communication band II and a radio frequency signal of the channel D of the communication band II are simultaneously inputted to the reception amplifier 31. The reception amplifier 31 amplifies each of the simultaneously inputted radio frequency signals of the channels A and D of the communication band II and outputs the resulting signals to the terminals 106R and 107R of the RFIC 10B.

The transmission filter 40 is arranged between the output terminal of the transmission amplifier 20 and the input terminal of the transmission filter unit 50T and is a filter that treats a bandwidth including the transmission bandwidth of the communication band I as a pass band and treats a bandwidth including the reception bandwidth of the communication band I as an attenuation band.

The transmission filter 41 is arranged between an output terminal of the transmission amplifier 21 and the input terminal of the transmission filter unit 51T and is a filter that treats a bandwidth including the transmission bandwidth of the communication band II as a pass band and treats a bandwidth including the reception bandwidth of the communication band II as an attenuation band.

With the configuration described above, the radio frequency front end module 3B can simultaneously transmit, for example, a radio frequency signal of the channel A and a radio frequency signal of the channel D in the communication band I, to which the plurality of communication channels are allocated. Moreover, the radio frequency front end module 3B can simultaneously transmit, for example, a radio frequency signal of the channel A and a radio frequency signal of the channel D in the communication band II, to which the plurality of communication channels are allocated.

With the radio frequency front end module 3B and the communication device 1B according to the present modification, even in a case where radio frequency signals of two different communication channels of the communication band I are simultaneously transmitted, a decrease in the reception sensitivity can be suppressed, and also even in a case where radio frequency signals of two different communication channels of the communication band II are simultaneously transmitted, a decrease in the reception sensitivity can be suppressed. That is, in both the communication band I and the communication band II, which support multiple bands, radio frequency signals of two different communication channels can be simultaneously transmitted, and a decrease in the reception sensitivity can be suppressed in this case.

Figure 4:
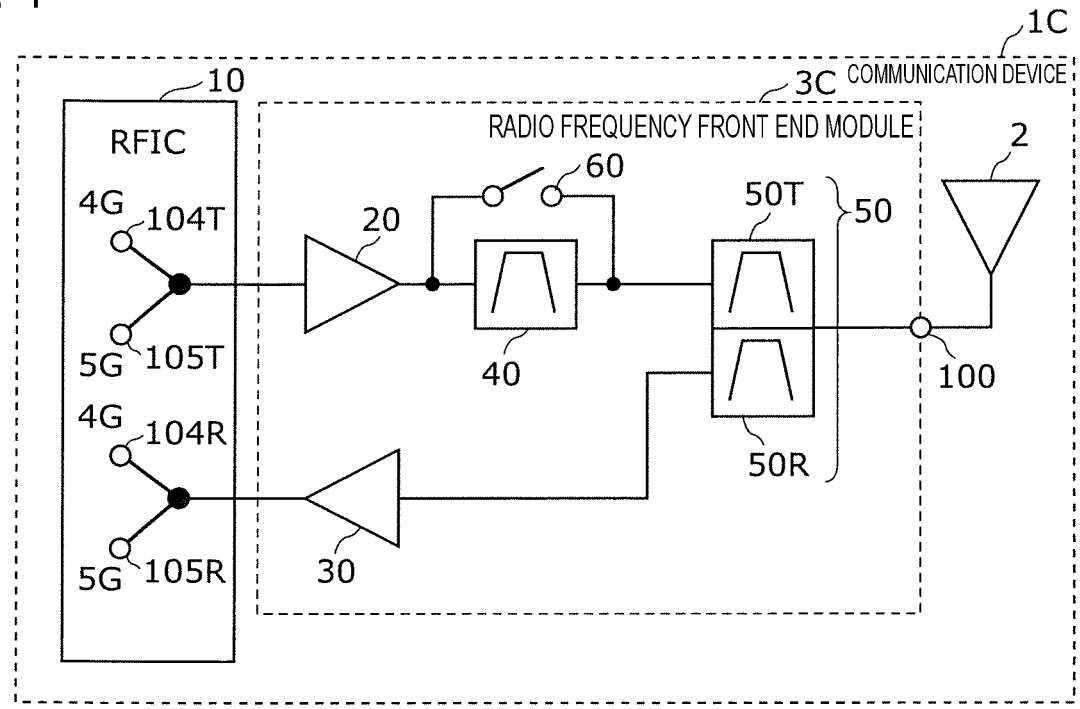
FIG. 4 is a circuit configuration diagram of a communication device according to a third modification of the first embodiment.

1.4 Configuration of Radio Frequency Front End Module and Communication Device According to Third Modification FIG. 4 is a circuit configuration diagram of a communication device 1C according to a third modification of the first embodiment. As illustrated in FIG. 4, the communication device 1C includes a radio frequency front end module 3C, the antenna circuit 2, and the RFIC 10. When the communication device 1C according to the present modification is compared with the communication device 1 according to the first embodiment, the radio frequency front end modules 3 and 3C differ in configuration. More specifically, the radio frequency front end module 3C differs from the radio frequency front end module 3 in that a switching circuit 60, which bypasses the transmission filter 40, is arranged. In the following, regarding the communication device 1C according to the present modification, the description of the same configuration as that of the communication device 1 according to the first embodiment will be omitted and different configurations will be mainly described.

The RFIC 10 has the terminal 104T, through which a radio frequency signal used in 4G is transmitted, and the terminal 105T, through which a radio frequency signal used in 5G is transmitted. The RFIC 10 simultaneously transmits, for example, a radio frequency signal of the channel A of the communication band I used as a 4G signal and a radio frequency signal of the channel D of the communication band I used as a 5G signal to the radio frequency front end module 3C. In addition, the RFIC 10 has the terminal 104R, through which a radio frequency signal used in 4G is received, and the terminal 105R, through which a radio frequency signal used in 5G is received. The RFIC 10 simultaneously receives, for example, a radio frequency signal of the channel A of the communication band I used as a 4G signal and a radio frequency signal of the channel D of the communication band I used as a 5G signal from the radio frequency front end module 3C.

Furthermore, the RFIC 10 transmits a radio frequency signal of a predetermined channel of the communication band I by itself to the radio frequency front end module 3C and receives a radio frequency signal of the predetermined channel by itself from the radio frequency front end module 3C.

Moreover, the RFIC 10 also has a function as a controller for controlling the connection of the switching circuit 60 in accordance with which one of the following modes is to be executed. The modes are a mode in which radio frequency signals of two channels are simultaneously transmitted and received and a mode in which a radio frequency signal of one channel is transmitted and received by itself.

The antenna circuit 2 is connected to the common antenna terminal 100 of the radio frequency front end module 3C and simultaneously emits and transmits and simultaneously receives, for example, a radio frequency signal of the channel A of the communication band I and a radio frequency signal of the channel D of the communication band I. Furthermore, the antenna circuit 2 emits and transmits and receives a radio frequency signal of the predetermined channel of the communication band I by itself.

Next, the configuration of the radio frequency front end module 3C will be described.

As illustrated in FIG. 4, the radio frequency front end module 3C includes the common antenna terminal 100, the transmission amplifier 20, the reception amplifier 30, the transmission filter 40, the duplexer 50, and the switching circuit 60.

The switching circuit 60 is connected to the output terminal of the transmission amplifier 20 and the input terminal of the transmission filter unit 50T and is a second switching circuit for switching between using and not using a bypass provided between the output terminal of the transmission amplifier 20 and the input terminal of the transmission filter unit 50T. In other words, the switching circuit 60 is the second switching circuit, which switches between bypassing and not bypassing the transmission filter 40.

According to this, for example, in a case where a radio frequency signal of the channel A of the communication band I and a radio frequency signal of the channel D of the communication band I are to be simultaneously transmitted, the switching circuit 60 is set to be nonconducting, and a decrease in the reception sensitivity can be suppressed similarly to as in the radio frequency front end module 3 according to the first embodiment. In addition, in a case where radio frequency signals of two channels are not to be simultaneously transmitted and a radio frequency signal of one of the channels is to be transmitted by itself, the switching circuit 60 is set to be conducting, and the propagation loss of the radio frequency signal caused by passing through the transmission filter 40 can be suppressed.

Figure 5:
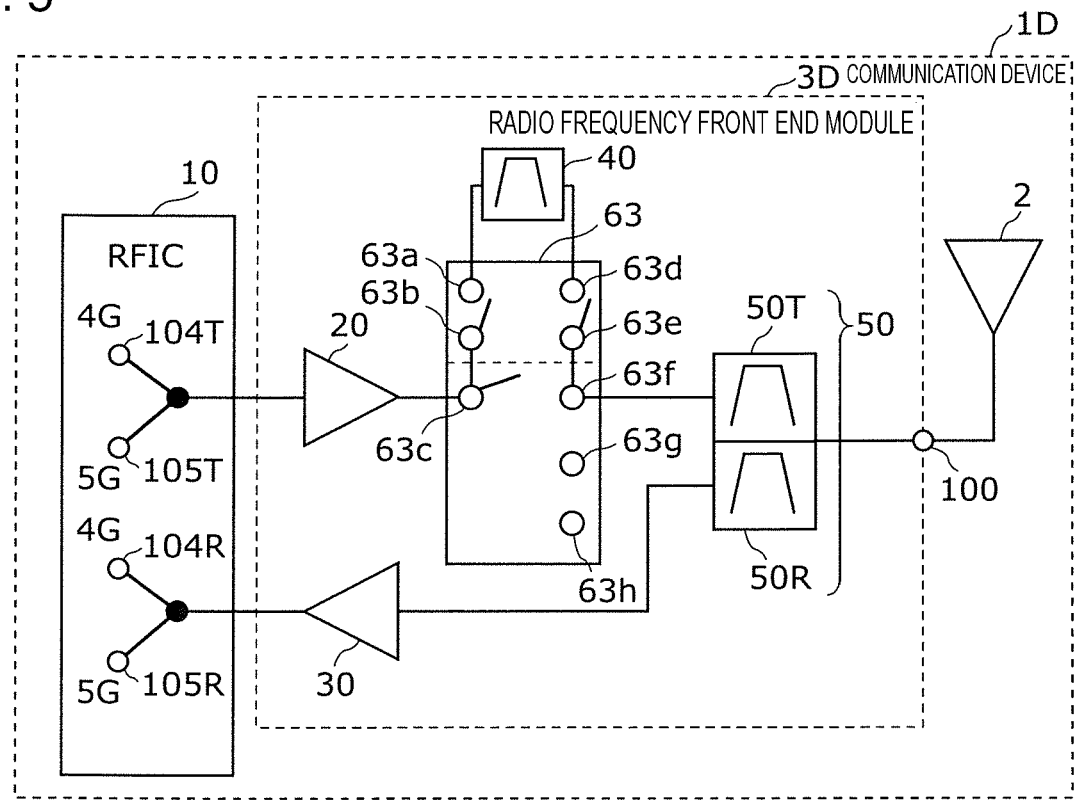
FIG. 5 is a circuit configuration diagram of a communication device according to a fourth modification of the first embodiment.

1.5 Configuration of Radio Frequency Front End Module and Communication Device According to Fourth Modification FIG. 5 is a circuit configuration diagram of a communication device 1D according to a fourth modification of the first embodiment. As illustrated in FIG. 5, the communication device 1D includes a radio frequency front end module 3D, the antenna circuit 2, and the RFIC 10. When the communication device 1D according to the present modification is compared with the communication device 1C according to the third modification, the radio frequency front end modules 3C and 3D differ in configuration. More specifically, the radio frequency front end module 3D differs from the radio frequency front end module 3C in that a switching circuit 63 is arranged instead of the switching circuit 60. In the following, regarding the communication device 1D according to the present modification, the description of the same configuration as that of the communication device 1C according to the third modification will be omitted and different configurations will be mainly described.

The RFIC 10 also has a function as a controller for controlling the connection of the switching circuit 63 in accordance with which one of the following modes is to be executed. The modes are the mode in which radio frequency signals of two channels are simultaneously transmitted and received and the mode in which a radio frequency signal of one channel is transmitted and received by itself.

As illustrated in FIG. 5, the radio frequency front end module 3D includes the common antenna terminal 100, the transmission amplifier 20, the reception amplifier 30, the transmission filter 40, the duplexer 50, and the switching circuit 63.

The switching circuit 63 is connected to the output terminal of the transmission amplifier 20 and the input terminal of the transmission filter unit 50T and is a second switching circuit for switching between using and not using a bypass provided between the output terminal of the transmission amplifier 20 and the input terminal of the transmission filter unit 50T. In other words, the switching circuit 63 is the second switching circuit, which switches between bypassing and not bypassing the transmission filter 40.

More specifically, the switching circuit 63 has terminals 63a, 63b, 63c, 63d, 63e, 63f, 63g, and 63h. The terminal 63c is connected to the output terminal of the transmission amplifier 20 and the terminal 63b, the terminal 63f is connected to the input terminal of the transmission filter unit 50T and the terminal 63e, the terminal 63a is connected to the input terminal of the transmission filter 40, and the terminal 63d is connected to an output terminal of the transmission filter 40. The terminal 63c and the terminal 63f form a single-pole single-throw (SPST) switch, the terminal 63a and the terminal 63b form a SPST switch, and the terminal 63d and the terminal 63e form a SPST switch. That is, the switching circuit 63 has three SPST switches. Note that the terminals 63g and 63h may be omitted.

With the configuration described above, for example, in a case where a radio frequency signal of the channel A of the communication band I and a radio frequency signal of the channel D of the communication band I are to be simultaneously transmitted, the terminal 63a is electrically connected to the terminal 63b, the terminal 63d is electrically connected to the terminal 63e, and the terminal 63c is not electrically connected to the terminal 63f, so that radio frequency signals outputted from the transmission amplifier 20 pass through the transmission filter 40 and enter the transmission filter unit 50T. In addition, in a case where a radio frequency signal of one of the channels is to be transmitted by itself, the terminal 63a is not electrically connected to the terminal 63b, the terminal 63d is not electrically connected to the terminal 63e, and the terminal 63c is electrically connected to the terminal 63f, so that a radio frequency signal outputted from the transmission amplifier 20 bypasses the transmission filter 40 and enters the transmission filter unit 50T.

According to this, for example, in a case where a radio frequency signal of the channel A of the communication band I and a radio frequency signal of the channel D of the communication band I are simultaneously transmitted, a decrease in the reception sensitivity can be suppressed by routing the radio frequency signals through the transmission filter 40. In addition, in a case where radio frequency signals of two channels are not to be simultaneously transmitted and a radio frequency signal of one of the channels is to be transmitted by itself, the input terminal of the transmission filter 40 is disconnected from the transmission amplifier 20, and the output terminal of the transmission filter 40 is disconnected from the transmission filter unit 50T. Thus, when viewed from the transmission amplifier 20 and the transmission filter unit 50T, the transmission filter 40 is in an open state, and thus the leakage of a radio frequency signal outputted from the transmission amplifier 20 into the transmission filter 40 can be suppressed. Thus, in a case where a radio frequency signal of one of the channels is to be transmitted by itself, the propagation loss of the radio frequency signal can be suppressed as much as possible.

Figure 6:
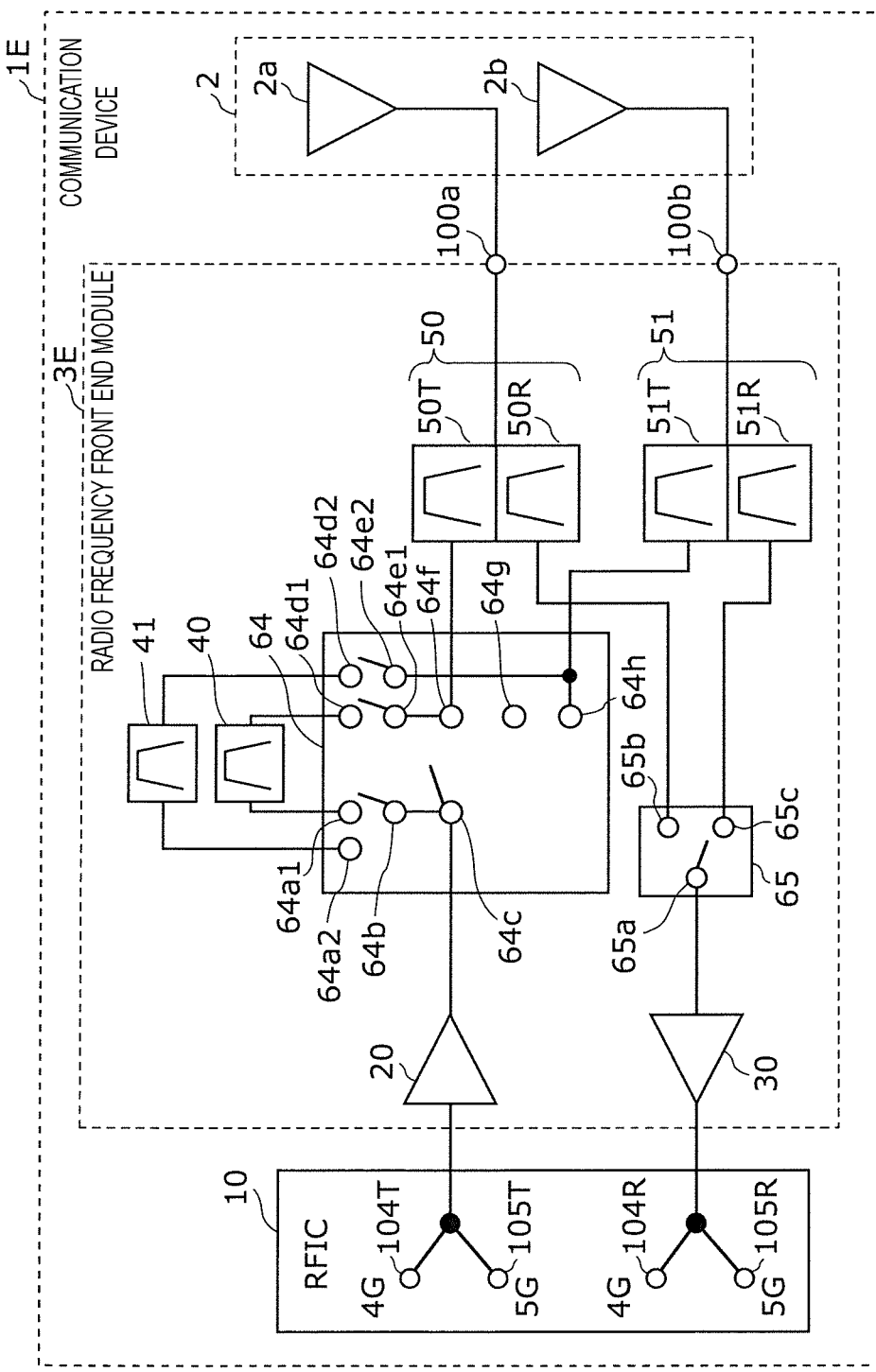
FIG. 6 is a circuit configuration diagram of a communication device according to a fifth modification of the first embodiment.

1.6 Configuration of Radio Frequency Front End Module and Communication Device According to Fifth Modification FIG. 6 is a circuit configuration diagram of a communication device 1E according to a fifth modification of the first embodiment. As illustrated in FIG. 6, the communication device 1E includes a radio frequency front end module 3E, an antenna circuit 2, and the RFIC 10. When the communication device 1E according to the present modification is compared with the communication device 1D according to the fourth modification, the radio frequency front end modules 3D and 3E differ in configuration and also the antenna circuits 2 differ in configuration. More specifically, the radio frequency front end module 3E differs from the radio frequency front end module 3D in that a switching circuit 64 is arranged instead of the switching circuit 63, that the transmission filter 41 is added in addition to the transmission filter 40, and that a duplexer 51 is added. In addition, the antenna circuit 2 according to the present modification differs from the antenna circuit 2 according to the fourth modification in that two antenna elements are arranged. In the following, regarding the communication device 1E according to the present modification, the description of the same configuration as that of the communication device 1D according to the fourth modification will be omitted and different configurations will be mainly described.

The RFIC 10 has the terminal 104T, through which a radio frequency signal used in 4G is transmitted, and the terminal 105T, through which a radio frequency signal used in 5G is transmitted. The RFIC 10 simultaneously transmits, for example, a radio frequency signal of the channel A of the communication band I used as a 4G signal and a radio frequency signal of the channel D of the communication band I used as a 5G signal to the radio frequency front end module 3E. In addition, the RFIC 10 simultaneously transmits, for example, a radio frequency signal of the channel A of the communication band II used as a 4G signal and a radio frequency signal of the channel D of the communication band II used as a 5G signal to the radio frequency front end module 3E. Moreover, the RFIC 10 has the terminal 104R, through which a radio frequency signal used in 4G is received, and the terminal 105R, through which a radio frequency signal used in 5G is received. The RFIC 10 simultaneously receives, for example, a radio frequency signal of the channel A of the communication band I used as a 4G signal and a radio frequency signal of the channel D of the communication band I used as a 5G signal from the radio frequency front end module 3E. In addition, the RFIC 10 simultaneously receives, for example, a radio frequency signal of the channel A of the communication band II used as a 4G signal and a radio frequency signal of the channel D of the communication band II used as a 5G signal from the radio frequency front end module 3E.

Furthermore, the RFIC 10 transmits a radio frequency signal of a predetermined channel of the communication band I by itself to the radio frequency front end module 3E and receives a radio frequency signal of the predetermined channel by itself from the radio frequency front end module 3E. In addition, the RFIC 10 transmits a radio frequency signal of a predetermined channel of the communication band II by itself to the radio frequency front end module 3E and receives a radio frequency signal of the predetermined channel by itself from the radio frequency front end module 3E.

Moreover, the RFIC 10 also has a function as a controller for controlling the connection of the switching circuit 64 in accordance with which one of the following modes is to be executed. The modes are the mode in which radio frequency signals of two channels are simultaneously transmitted and received and the mode in which a radio frequency signal of one channel is transmitted and received by itself.

The antenna circuit 2 includes antenna elements 2a and 2b. The antenna element 2a is connected to a common antenna terminal 100a of the radio frequency front end module 3E and emits and transmits and receives, for example, a radio frequency signal of the communication band I. The antenna element 2b is connected to a common antenna terminal 100b of the radio frequency front end module 3E and emits and transmits and receives, for example, a radio frequency signal of the communication band II.

As illustrated in FIG. 6, the radio frequency front end module 3E includes the common antenna terminals 100a and 100b, the transmission amplifier 20, the reception amplifier 30, the transmission filters 40 and 41, the duplexers 50 and 51, the switching circuit 64, and a switch 65.

The duplexer 50 is a multiplexer including the transmission filter unit 50T and the reception filter unit 50R. The transmission filter unit 50T treats the transmission bandwidth of the communication band I as a pass band, and the reception filter unit 50R treats the reception bandwidth of the communication band I as a pass band.

The duplexer 51 is a multiplexer including the transmission filter unit 51T and the reception filter unit 51R. The transmission filter unit 51T treats the transmission bandwidth of the communication band II as a pass band, and the reception filter unit 51R treats the reception bandwidth of the communication band II as a pass band.

The common antenna terminal 100a is connected to the antenna element 2a, the output terminal of the transmission filter unit 50T, and the input terminal of the reception filter unit 50R. The common antenna terminal 100b is connected to the antenna element 2b, the output terminal of the transmission filter unit 51T, and the input terminal of the reception filter unit 51R.

The transmission amplifier 20 is a power amplifier that amplifies a radio frequency signal. Radio frequency signals of the communication bands I and II are inputted to the transmission amplifier 20. The transmission amplifier 20 amplifies each of the simultaneously inputted radio frequency signals of two channels of the communication band I and outputs the resulting signals toward the input terminal of the transmission filter 40 through switching of the switching circuit 64. In addition, the transmission amplifier 20 amplifies each of the simultaneously inputted radio frequency signals of two channels of the communication band II and outputs the resulting signals toward the input terminal of the transmission filter 41 through switching of the switching circuit 64. In addition, the transmission amplifier 20 amplifies an inputted radio frequency signal of one channel of the communication band I and outputs the resulting signal toward the transmission filter unit 50T, without the signal passing through the transmission filter 40, through switching of the switching circuit 64. In addition, the transmission amplifier 20 amplifies an inputted radio frequency signal of one channel of the communication band II and outputs the resulting signal toward the transmission filter unit 51T, without the signal passing through the transmission filter 41, through switching of the switching circuit 64.

The reception amplifier 30 is a low-noise amplifier that amplifies a radio frequency signal so as to have low noise. Radio frequency signals of the two channels of the communication band I and radio frequency signals of the two channels of the communication band II are simultaneously inputted to the reception amplifier 30. In addition, a radio frequency signal of one channel of the communication band I and a radio frequency signal of one channel of the communication band II are inputted to the reception amplifier 30. The reception amplifier 30 amplifies each of the simultaneously inputted radio frequency signals of the two channels of the communication band I and outputs the resulting signals to the terminals 104R and 105R of the RFIC 10. In addition, the reception amplifier 30 amplifies each of the simultaneously inputted radio frequency signals of the two channels of the communication band II and outputs the resulting signals to the terminals 104R and 105R of the RFIC 10.

The transmission filter 40 is arranged between the output terminal of the transmission amplifier 20 and the input terminal of the transmission filter unit 50T and is a filter that treats a bandwidth including the transmission bandwidth of the communication band I as a pass band and treats a bandwidth including the reception bandwidth of the communication band I as an attenuation band.

The transmission filter 41 is arranged between the output terminal of the transmission amplifier 20 and the input terminal of the transmission filter unit 51T and is a filter that treats a bandwidth including the transmission bandwidth of the communication band II as a pass band and treats a bandwidth including the reception bandwidth of the communication band II as an attenuation band.

The switch 65 has a common terminal 65a and selection terminals 65b and 65c. The common terminal 65a is connected to the input terminal of the reception amplifier 30, the selection terminal 65b is connected to the output terminal of the reception filter unit 50R, and the selection terminal 65c is connected to the output terminal of the reception filter unit 51R. With this configuration, the switch 65 switches between the connection of the reception amplifier 30 to the reception filter unit 50R and the connection of the reception amplifier 30 to the reception filter unit 51R.

The switching circuit 64 is connected to the output terminal of the transmission amplifier 20 and the input terminals of the transmission filter units 50T and 51T. The switching circuit 64 is a second switching circuit for switching between using and not using a bypass provided between the output terminal of the transmission amplifier 20 and the input terminal of the transmission filter unit 50T and for switching between using and not using a bypass provided between the output terminal of the transmission amplifier 20 and the input terminal of the transmission filter unit 51T. In other words, the switching circuit 64 is the second switching circuit, which switches between bypassing and not bypassing the transmission filter 40 and switches between bypassing and not bypassing the transmission filter 41.

More specifically, the switching circuit 64 has terminals 64a1, 64a2, 64b, 64c, 64d1, 64d2, 64e1, 64e2, 64f, 64g, and 64h. The terminal 64c is connected to the output terminal of the transmission amplifier 20 and the terminal 64b, the terminal 64f is connected to the input terminal of the transmission filter unit 50T and the terminal 64e1, the terminal 64a1 is connected to the input terminal of the transmission filter 40, the terminal 64d1 is connected to the output terminal of the transmission filter 40, the terminal 64a2 is connected to the input terminal of the transmission filter 41, the terminal 64d2 is connected to an output terminal of the transmission filter 41, and the terminal 64h is connected to the input terminal of the transmission filter unit 51T and the terminal 64e2. The terminal 64c is put into a conductive state with one of the terminals 64f, 64g, and 64h, and the terminal 64c and the terminals 64f, 64g, and 64h form a single-pole 3-throw (SP3T) switch. In addition, the terminals 64a1 and 64a2 and the terminal 64b form a single-pole double-throw (SPDT) switch, the terminal 64d1 and the terminal 64e1 form a SPST switch, and the terminal 64d2 and the terminal 64e2 form a SPST switch. That is, the switching circuit 64 has one SP3T switch, one SPDT switch, and two SPST switches. Note that the terminal 64g may be omitted.

With the configuration described above, for example, in a case where a radio frequency signal of the channel A of the communication band I and a radio frequency signal of the channel D of the communication band I are to be simultaneously transmitted, the terminal 64a1 is electrically connected to the terminal 64b, the terminal 64d1 is electrically connected to the terminal 64e1, and the terminal 64c is not electrically connected to the terminal 64f, so that radio frequency signals outputted from the transmission amplifier 20 pass through the transmission filter 40 and enter the transmission filter unit 50T. In addition, for example, in a case where a radio frequency signal of the channel A of the communication band II and a radio frequency signal of the channel D of the communication band II are to be simultaneously transmitted, the terminal 64a2 is electrically connected to the terminal 64b, the terminal 64d2 is electrically connected to the terminal 64e2, and the terminal 64c is not electrically connected to the terminal 64f, so that radio frequency signals outputted from the transmission amplifier 20 pass through the transmission filter 41 and enter the transmission filter unit 51T. In addition, in a case where a radio frequency signal of one of the channels of the communication band I is to be transmitted by itself, the terminals 64a1 and 64a2 are not electrically connected to the terminal 64b, the terminal 64d1 is not electrically connected to the terminal 64e1, the terminal 64d2 is not electrically connected to the terminal 64e2, and the terminal 64c is electrically connected to the terminal 64f, so that a radio frequency signal outputted from the transmission amplifier 20 bypasses the transmission filters 40 and 41 and enters the transmission filter unit 50T. In addition, in a case where a radio frequency signal of one of the channels of the communication band II is to be transmitted by itself, the terminals 64a1 and 64a2 are not electrically connected to the terminal 64b, the terminal 64d1 is not electrically connected to the terminal 64e1, the terminal 64d2 is not electrically connected to the terminal 64e2, and the terminal 64c is electrically connected to the terminal 64h, so that a radio frequency signal outputted from the transmission amplifier 20 bypasses the transmission filters 40 and 41 and enters the transmission filter unit 51T.

According to this, in a case where radio frequency signals of the two channels of the communication band I are simultaneously transmitted, a decrease in the reception sensitivity can be suppressed by routing the radio frequency signals through the transmission filter 40. Moreover, in a case where radio frequency signals of the two channels of the communication band II are simultaneously transmitted, a decrease in the reception sensitivity can be suppressed by routing the radio frequency signals through the transmission filter 41. In addition, in a case where radio frequency signals of the two channels of the communication band I are not to be simultaneously transmitted and a radio frequency signal of one of the channels of the communication band I is to be transmitted by itself, the input terminal of the transmission filter 40 is disconnected from the transmission amplifier 20, and the output terminal of the transmission filter 40 is disconnected from the transmission filter unit 50T. Thus, when viewed from the transmission amplifier 20 and the transmission filter unit 50T, the transmission filter 40 is in an open state, and thus the leakage of a radio frequency signal outputted from the transmission amplifier 20 into the transmission filter 40 can be suppressed. In addition, in a case where radio frequency signals of the two channels of the communication band II are not to be simultaneously transmitted and a radio frequency signal of one of the channels of the communication band II is to be transmitted by itself, the input terminal of the transmission filter 41 is disconnected from the transmission amplifier 20, and the output terminal of the transmission filter 41 is disconnected from the transmission filter unit 51T. Thus, when viewed from the transmission amplifier 20 and the transmission filter unit 51T, the transmission filter 41 is in an open state, and thus the leakage of a radio frequency signal outputted from the transmission amplifier 20 into the transmission filter 41 can be suppressed. Thus, in a case where a radio frequency signal of one of the channels is to be transmitted by itself, the propagation loss of the radio frequency signal can be suppressed as much as possible.

Figure 7:
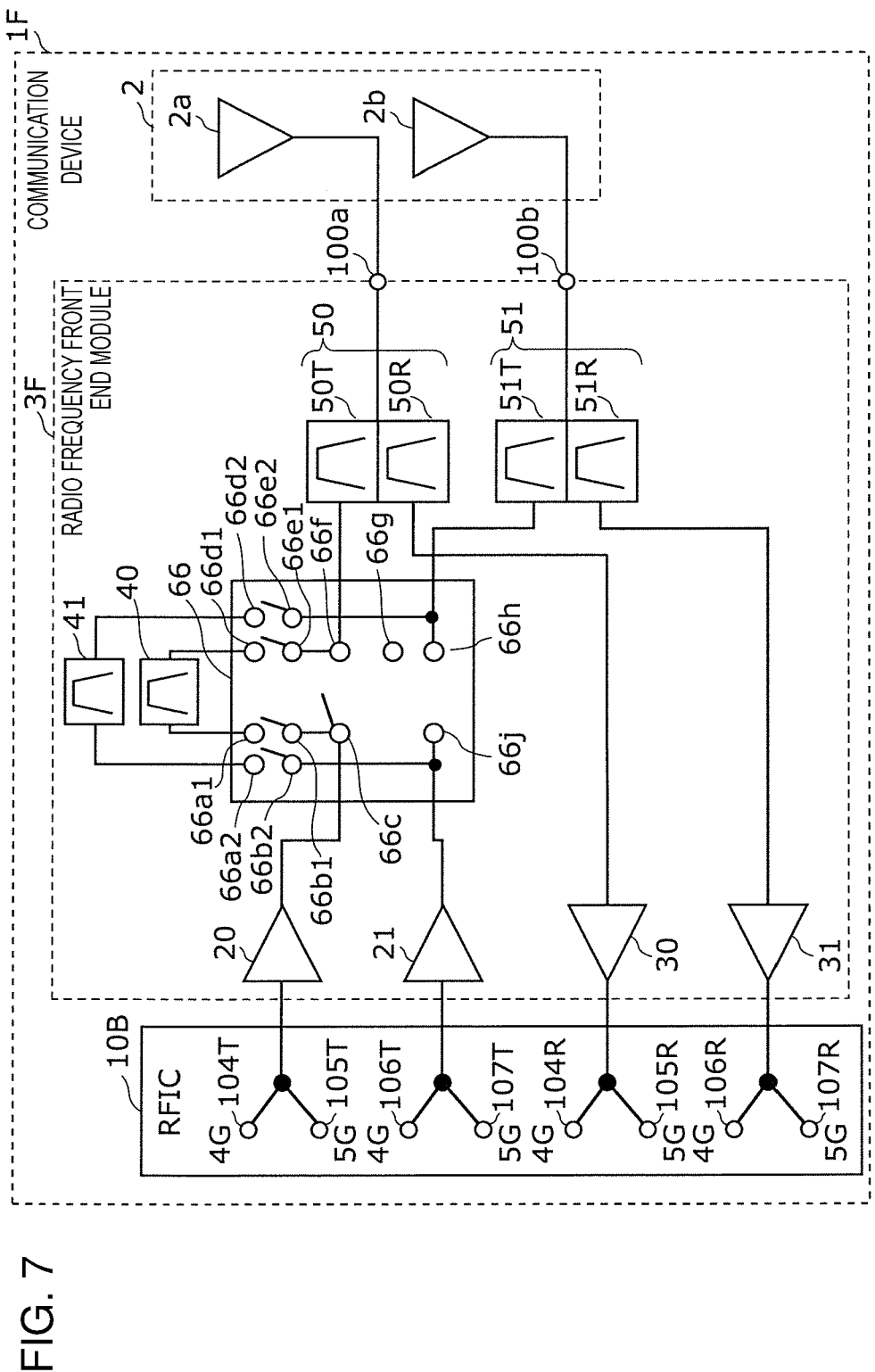
FIG. 7 is a circuit configuration diagram of a communication device according to a sixth modification of the first embodiment.

1.7 Configuration of Radio Frequency Front End Module and Communication Device According to Sixth Modification FIG. 7 is a circuit configuration diagram of a communication device 1F according to a sixth modification of the first embodiment. As illustrated in FIG. 7, the communication device 1F includes a radio frequency front end module 3F, the antenna circuit 2, and the RFIC 10B. When the communication device 1F according to the present modification is compared with the communication device 1E according to the fifth modification, the radio frequency front end modules 3E and 3F differ in configuration and the RFICs 10 and 10B differ in configuration. More specifically, the radio frequency front end module 3F differs from the radio frequency front end module 3E in that a switching circuit 66 is arranged instead of the switching circuit 64 and that the transmission amplifier 21 and the reception amplifier 31 are added. Moreover, the RFIC 10B according to the present modification differs from the RFIC 10 of the fifth modification in that 4G terminals and 5G terminals are arranged for each of the communication bands I and II. In the following, regarding the communication device 1F according to the present modification, the description of the same configuration as that of the communication device 1E according to the fifth modification will be omitted and different configurations will be mainly described.

The RFIC 10B has the terminal 104T, through which a radio frequency signal of the communication band I used in 4G is transmitted, and the terminal 105T, through which a radio frequency signal of the communication band I used in 5G is transmitted. The RFIC 10B also has the terminal 106T, through which a radio frequency signal of the communication band II used in 4G is transmitted, and the terminal 107T, through which a radio frequency signal of the communication band II used in 5G is transmitted. The RFIC 10B can simultaneously transmit, for example, a radio frequency signal of the channel A of the communication band I used as a 4G signal and a radio frequency signal of the channel D of the communication band I used as a 5G signal to the radio frequency front end module 3F, and simultaneously transmit, for example, a radio frequency signal of the channel A of the communication band II used as a 4G signal and a radio frequency signal of the channel D of the communication band II used as a 5G signal to the radio frequency front end module 3F.

Moreover, the RFIC 10B has the terminal 104R, through which a radio frequency signal of the communication band I used in 4G is received, and the terminal 105R, through which a radio frequency signal of the communication band I used in 5G is received. The RFIC 10B also has the terminal 106R, through which a radio frequency signal of the communication band II used in 4G is received, and the terminal 107R, through which a radio frequency signal of the communication band II used in 5G is received. The RFIC 10B can simultaneously receive, for example, a radio frequency signal of the channel A of the communication band I used as a 4G signal and a radio frequency signal of the channel D of the communication band I used as a 5G signal from the radio frequency front end module 3F, and simultaneously receive, for example, a radio frequency signal of the channel A of the communication band II used as a 4G signal and a radio frequency signal of the channel D of the communication band II used as a 5G signal from the radio frequency front end module 3F.

As illustrated in FIG. 7, the radio frequency front end module 3F includes the common antenna terminals 100a and 100b, the transmission amplifiers 20 and 21, the reception amplifiers 30 and 31, the transmission filters 40 and 41, the duplexers 50 and 51, and the switching circuit 66.

The transmission amplifier 20 is a power amplifier that amplifies a radio frequency signal. Among the plurality of communication channels allocated to the communication band I, radio frequency signals of two channels are simultaneously inputted to the transmission amplifier 20. The transmission amplifier 20 amplifies each of the simultaneously inputted radio frequency signals of the two channels of the communication band I and outputs the resulting signals toward the input terminal of the transmission filter 40. In addition, the transmission amplifier 20 amplifies a radio frequency signal of one channel of the communication band I and outputs the resulting signal toward the transmission filter unit 50T, without the signal passing through the transmission filter 40.

The transmission amplifier 21 is a power amplifier that amplifies a radio frequency signal. Among the plurality of communication channels allocated to the communication band II, radio frequency signals of two channels are simultaneously inputted to the transmission amplifier 21. The transmission amplifier 21 amplifies each of the simultaneously inputted radio frequency signals of the two channels of the communication band II and outputs the resulting signals toward the input terminal of the transmission filter 41. In addition, the transmission amplifier 21 amplifies a radio frequency signal of one channel of the communication band II and outputs the resulting signal toward the transmission filter unit 51T, without the signal passing through the transmission filter 41.

The reception amplifier 30 is a low-noise amplifier that amplifies a radio frequency signal so as to have low noise. Radio frequency signals of the two channels of the communication band I are simultaneously inputted to the reception amplifier 30. The reception amplifier 30 amplifies each of the simultaneously inputted radio frequency signals of the two channels of the communication band I and outputs the resulting signals to the terminals 104R and 105R of the RFIC 10B.

The reception amplifier 31 is a low-noise amplifier that amplifies a radio frequency signal so as to have low noise. Radio frequency signals of the two channels of the communication band II are simultaneously inputted to the reception amplifier 31. The reception amplifier 31 amplifies each of the simultaneously inputted radio frequency signals of the two channels of the communication band II and outputs the resulting signals to the terminals 106R and 107R of the RFIC 10B.

The switching circuit 66 is connected to the output terminals of the transmission amplifiers 20 and 21 and the input terminals of the transmission filter units 50T and 51T. The switching circuit 66 is a second switching circuit for switching between using and not using a bypass provided between the output terminal of the transmission amplifier 20 and the input terminal of the transmission filter unit 50T and for switching between using and not using a bypass provided between the output terminal of the transmission amplifier 21 and the input terminal of the transmission filter unit 51T. In other words, the switching circuit 66 is the second switching circuit, which switches between bypassing and not bypassing the transmission filter 40 and switches between bypassing and not bypassing the transmission filter 41.

More specifically, the switching circuit 66 has terminals 66a1, 66a2, 66b1, 66b2, 66c, 66d1, 66d2, 66e1, 66e2, 66f, 66g, 66h, and 66j. The terminal 66c is connected to the output terminal of the transmission amplifier 20 and the terminal 66b1, the terminal 66j is connected to the output terminal of the transmission amplifier 21 and the terminal 66b2, the terminal 66f is connected to the input terminal of the transmission filter unit 50T and the terminal 66e1, the terminal 66a1 is connected to the input terminal of the transmission filter 40, the terminal 66d1 is connected to the output terminal of the transmission filter 40, the terminal 66a2 is connected to the input terminal of the transmission filter 41, the terminal 66d2 is connected to the output terminal of the transmission filter 41, and the terminal 66h is connected to the input terminal of the transmission filter unit 51T and the terminal 66e2. The terminal 66c is put into a conductive state with one of the terminals 66f and 66g, and the terminal 66c and the terminals 66f and 66g form a SPDT switch. The terminal 66j is put into a conductive state with one of the terminals 66h and 66g, and the terminal 66j and the terminals 66h and 66g form a SPDT switch. In addition, the terminal 66a1 and the terminal 66b1 form a SPST switch, the terminal 66a2 and the terminal 66b2 form a SPST switch, the terminal 66d1 and the terminal 66e1 form a SPST switch, and the terminal 66d2 and the terminal 66e2 form a SPST switch. That is, the switching circuit 66 has two SPDT switches and four SPST switches. Note that the terminal 66g may be omitted.

With the configuration described above, for example, in a case where a radio frequency signal of the channel A of the communication band I and a radio frequency signal of the channel D of the communication band I are to be simultaneously transmitted, the terminal 66a1 is electrically connected to the terminal 66b1, the terminal 66d1 is electrically connected to the terminal 66e1, and the terminal 66c is not electrically connected to the terminal 66f, so that radio frequency signals outputted from the transmission amplifier 20 pass through the transmission filter 40 and enter the transmission filter unit 50T. In addition, for example, in a case where a radio frequency signal of the channel A of the communication band II and a radio frequency signal of the channel D of the communication band II are to be simultaneously transmitted, the terminal 66a2 is electrically connected to the terminal 66b2, the terminal 66d2 is electrically connected to the terminal 66e2, and the terminal 66j is not electrically connected to the terminal 66h, so that radio frequency signals outputted from the transmission amplifier 21 pass through the transmission filter 41 and enter the transmission filter unit 51T. In addition, in a case where a radio frequency signal of one of the channels of the communication band I is to be transmitted by itself, the terminal 66a1 is not electrically connected to the terminal 66b1, the terminal 66a2 is not electrically connected to the terminal 66b2, the terminal 66d1 is not electrically connected to the terminal 66e1, the terminal 66d2 is not electrically connected to the terminal 66e2, and the terminal 66c is electrically connected to the terminal 66f, so that a radio frequency signal outputted from the transmission amplifier 20 bypasses the transmission filters 40 and 41 and enters the transmission filter unit 50T. In addition, in a case where a radio frequency signal of one of the channels of the communication band II is to be transmitted by itself, the terminal 66a1 is not electrically connected to the terminal 66b1, the terminal 66a2 is not electrically connected to the terminal 66b2, the terminal 66d1 is not electrically connected to the terminal 66e1, the terminal 66d2 is not electrically connected to the terminal 66e2, and the terminal 66j is electrically connected to the terminal 66h, so that a radio frequency signal outputted from the transmission amplifier 21 bypasses the transmission filters 40 and 41 and enters the transmission filter unit 51T.

According to this, in a case where radio frequency signals of the two channels of the communication band I are simultaneously transmitted, a decrease in the reception sensitivity can be suppressed by routing the radio frequency signals through the transmission filter 40. Moreover, in a case where radio frequency signals of the two channels of the communication band II are simultaneously transmitted, a decrease in the reception sensitivity can be suppressed by routing the radio frequency signals through the transmission filter 41. In addition, in a case where radio frequency signals of the two channels of the communication band I are not to be simultaneously transmitted and a radio frequency signal of one of the channels of the communication band I is to be transmitted by itself, the input terminal of the transmission filter 40 is disconnected from the transmission amplifier 20, and the output terminal of the transmission filter 40 is disconnected from the transmission filter unit 50T. Thus, when viewed from the transmission amplifier 20 and the transmission filter unit 50T, the transmission filter 40 is in an open state, and thus the leakage of a radio frequency signal outputted from the transmission amplifier 20 into the transmission filter 40 can be suppressed. In addition, in a case where radio frequency signals of the two channels of the communication band II are not to be simultaneously transmitted and a radio frequency signal of one of the channels of the communication band II is to be transmitted by itself, the input terminal of the transmission filter 41 is disconnected from the transmission amplifier 21, and the output terminal of the transmission filter 41 is disconnected from the transmission filter unit 51T. Thus, when viewed from the transmission amplifier 21 and the transmission filter unit 51T, the transmission filter 41 is in an open state, and thus the leakage of a radio frequency signal outputted from the transmission amplifier 21 into the transmission filter 41 can be suppressed. Thus, in a case where a radio frequency signal of one of the channels is to be transmitted by itself, the propagation loss of the radio frequency signal can be suppressed as much as possible.

Second Embodiment

In a second embodiment, regarding the communication device and radio frequency front end module according to the first embodiment, a configuration for suppressing emission of a spurious signal caused by intermodulation distortion from an antenna circuit will be further described, the intermodulation distortion being caused by radio frequency signals of two channels of the same communication band.

Figure 8:
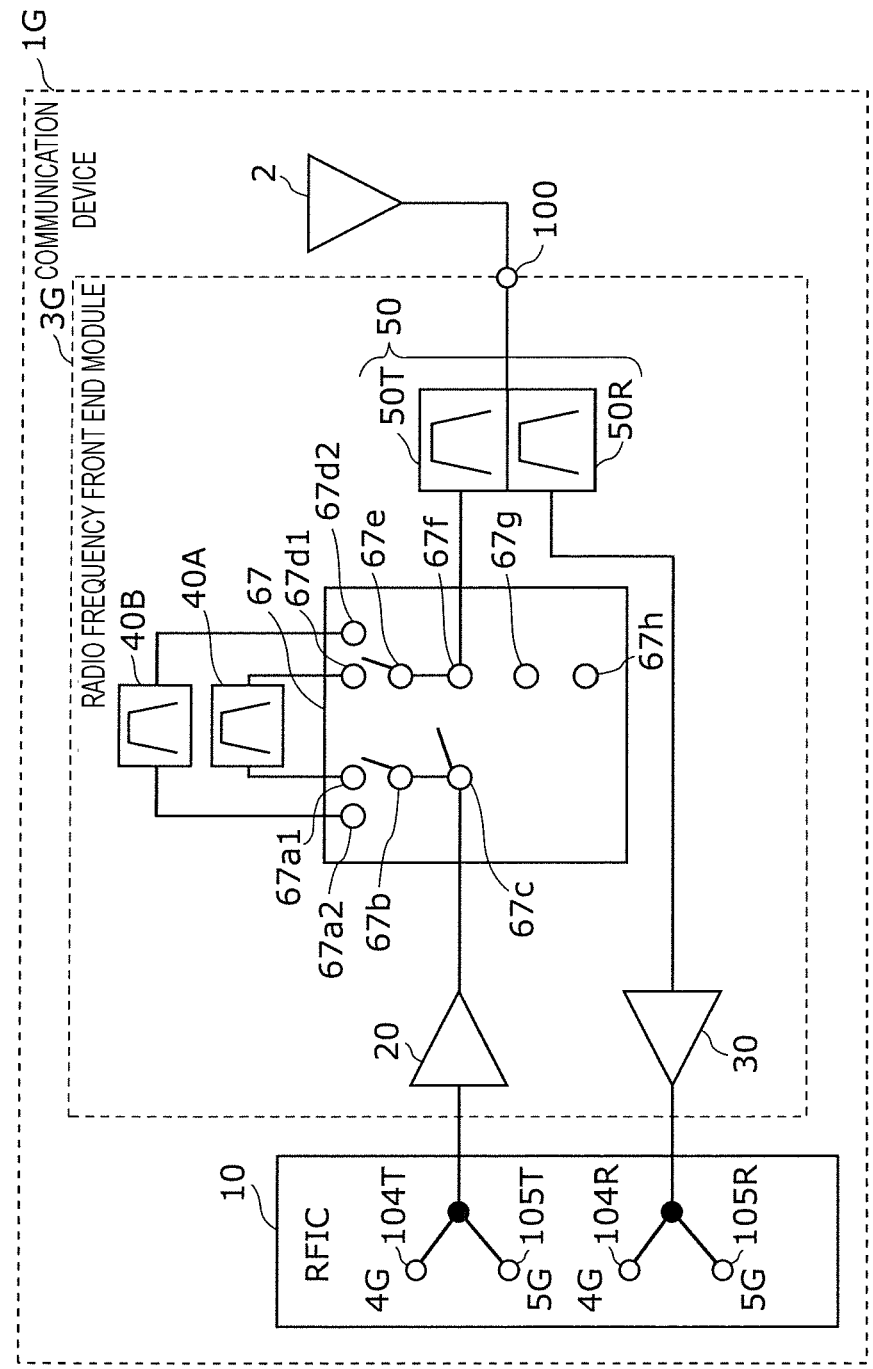
FIG. 8 is a circuit configuration diagram of a communication device according to a second embodiment.

FIG. 8 is a circuit configuration diagram of a communication device 1G according to a second embodiment. As illustrated in FIG. 8, the communication device 1G includes a radio frequency front end module 3G, the antenna circuit 2, and the RFIC 10. When the communication device 1G according to the present embodiment is compared with the communication device 1 according to the first embodiment, the radio frequency front end modules 3 and 3G differ in configuration. More specifically, the radio frequency front end module 3G differs from the radio frequency front end module 3 in that transmission filters 40A and 40B are arranged and that a switching circuit 67 is arranged. In the following, regarding the communication device 1G according to the present embodiment, the description of the same configuration as that of the communication device 1 according to the first embodiment will be omitted and different configurations will be mainly described.

The radio frequency front end module 3G and the communication device 1G according to the present embodiment process radio frequency signals of the communication band I, to which the plurality of communication channels are allocated. The communication band I has a first subband, which is a portion of a frequency bandwidth of the communication band I, and a second subband, which is a portion of the frequency bandwidth of the communication band I and has a bandwidth different from and overlapping the frequency bandwidth of the first subband. The radio frequency front end module 3G and the communication device 1G can simultaneously transmit a radio frequency signal of the first communication channel in the communication band I and a radio frequency signal of the second communication channel, which differs from the first communication channel in frequency, in the communication band I.

As illustrated in FIG. 8, the radio frequency front end module 3G includes the common antenna terminal 100, the transmission amplifier 20, the reception amplifier 30, the transmission filters 40A and 40B, the duplexer 50, and the switching circuit 67.

The duplexer 50 is a multiplexer including the transmission filter unit 50T and the reception filter unit 50R. The transmission filter unit 50T treats the transmission bandwidth of the communication band I as a pass band, and the reception filter unit 50R treats the reception bandwidth of the communication band I as a pass band.

The transmission amplifier 20 is a power amplifier that amplifies a radio frequency signal. Among a plurality of communication channels allocated to the same communication band, a radio frequency signal of the first communication channel and a radio frequency signal of the second communication channel are simultaneously inputted to the transmission amplifier 20. In the present embodiment, for example, a radio frequency signal of the channel A (the first communication channel) of the communication band I and a radio frequency signal of the channel D (the second communication channel) of the communication band I are simultaneously inputted to the transmission amplifier 20 from the RFIC 10. The transmission amplifier 20 amplifies each of the simultaneously inputted radio frequency signals of the channels A and D and outputs the resulting signals toward the transmission filter 40.

The reception amplifier 30 is a low-noise amplifier that amplifies a radio frequency signal so as to have low noise. A radio frequency signal of the first communication channel and a radio frequency signal of the second communication channel are simultaneously inputted to the reception amplifier 30. In the present embodiment, for example, a radio frequency signal of the channel A (the first communication channel) of the communication band I and a radio frequency signal of the channel D (the second communication channel) of the communication band I are simultaneously inputted to the reception amplifier 30 from the antenna circuit 2 via the reception filter unit 50R. The reception amplifier 30 amplifies each of the simultaneously inputted radio frequency signals of the channels A and D and outputs the resulting signals to the terminals 104R and 105R of the RFIC 10.

In the present embodiment, for example, Band 71 (the transmission bandwidth: 663-698 MHz, the reception bandwidth: 617-652 MHz) for Long Term Evolution (LTE) is applied as an example of the communication band I.

Figure 9:
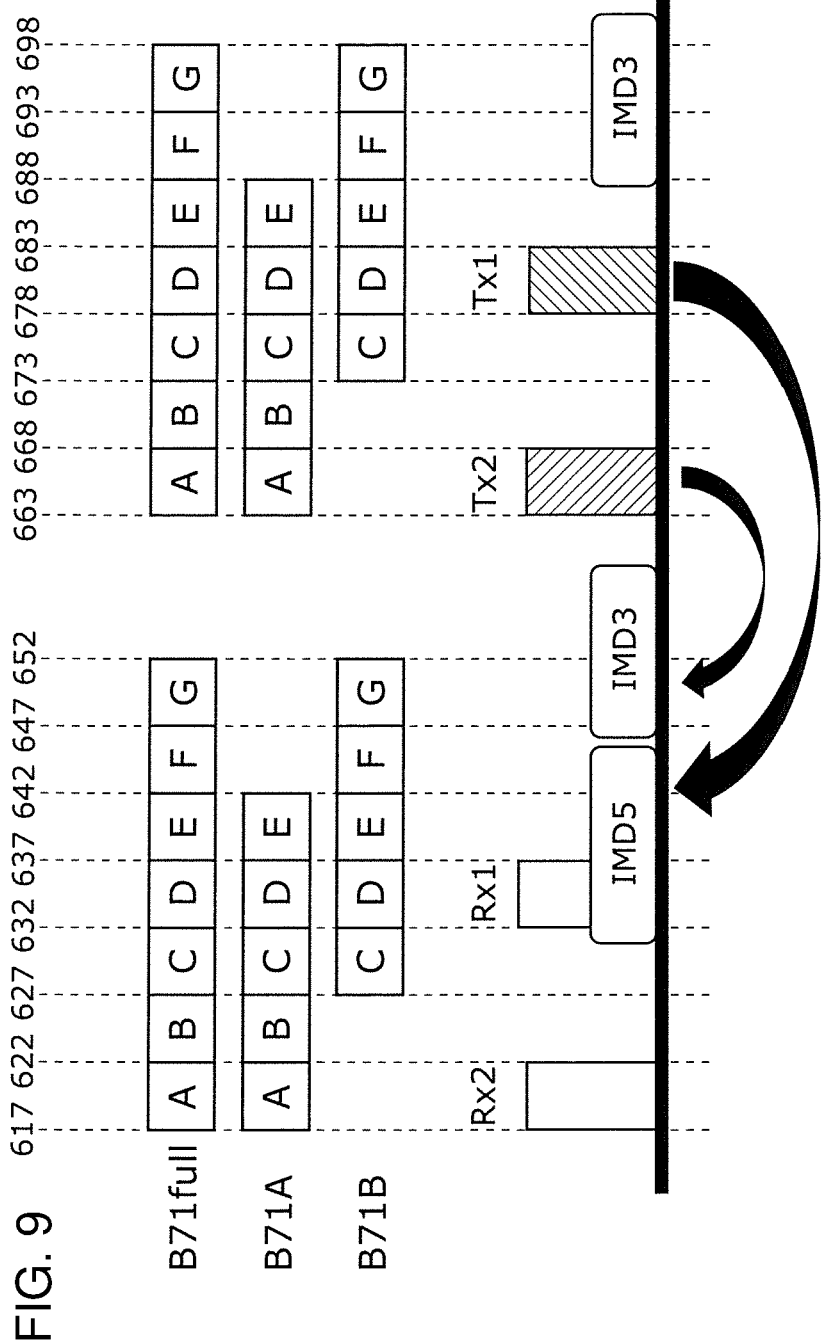
FIG. 9 is a diagram illustrating communication channel allocation and intermodulation distortion in LTE-Band 71.

FIG. 9 is a diagram illustrating communication channel allocation and intermodulation distortion in LTE-Band 71. As illustrated in FIG. 9, Band 71 has, for example, channels A to G. Band 71A (a transmission bandwidth: 663-688 MHz, a reception bandwidth: 617-642 MHz) corresponds to a first subband, which is a portion of the frequency bandwidth of Band 71. In addition, Band 71B (a transmission bandwidth: 673-698 MHz, a reception bandwidth: 627-652 MHz) corresponds to a second subband, which is a portion of the frequency bandwidth of Band 71. Band 71A and Band 71B have different frequency bandwidths from each other and an overlapping bandwidth (a transmission overlapping bandwidth: 673-688 MHz, a reception overlapping bandwidth: 627-642 MHz).

In Band 71, for example, when a radio frequency transmission signal $T_XA$ of the channel A (the center frequency: 665.5 MHz) and a radio frequency transmission signal $T_XB$ of the channel D (the center frequency: 680.5 MHz) are simultaneously inputted to the transmission amplifier 20, intermodulation distortion is caused by the two radio frequency transmission signals. Here, the frequency of the fifth order intermodulation distortion (IMD5: $3 \times f_{TXA} - 2 \times f_{TXB}$) is 635.5 MHz and is included in the reception bandwidth of Band 71 (617-652 MHz). In addition, the frequency of the third order intermodulation distortion (IMD3: $2 \times f_{TXA} - f_{TXB}$) is 650.5 MHz and is included in the reception bandwidth of Band 71 (617-652 MHz). Moreover, the frequency of the third order intermodulation distortion (IMD3: $2 \times f_{TXB} - f_{TXA}$) is 695.5 MHz and is included in the transmission bandwidth of Band 71B (and a bandwidth that is not the transmission bandwidth of Band 71A).

The transmission filter 40A is arranged between the output terminal of the transmission amplifier 20 and the input terminal of the transmission filter unit 50T. The transmission filter 40A is a first transmission filter, which treats the transmission bandwidth of the first subband (Band 71A) as a pass band, the reception bandwidth of the first subband (Band 71A) as an attenuation band, and the bandwidth obtained by eliminating the first subband (Band 71A) from the frequency bandwidth of the communication band I (Band 71) as an attenuation band.

The transmission filter 40B is arranged between the output terminal of the transmission amplifier 20 and the input terminal of the transmission filter unit 50T. The transmission filter 40B is a second transmission filter, which treats the transmission bandwidth of the second subband (Band 71B) as a pass band, the reception bandwidth of the second subband (Band 71B) as an attenuation band, and the bandwidth obtained by eliminating the second subband (Band 71B) from the frequency bandwidth of the communication band I (Band 71) as an attenuation band.

The switching circuit 67 is connected to the output terminal of the transmission amplifier 20 and the input terminal of the transmission filter unit 50T. The switching circuit 67 is a first switching circuit and also a second switching circuit for switching between using a bypass provided between the output terminal of the transmission amplifier 20 and the input terminal of the transmission filter unit 50T, passing through the transmission filter 40A, and passing through the transmission filter 40B.

More specifically, the switching circuit 67 has terminals 67a1, 67a2, 67b, 67c, 67d1, 67d2, 67e, 67f, 67g, and 67h. The terminal 67c is connected to the output terminal of the transmission amplifier 20 and the terminal 67b, the terminal 67f is connected to the input terminal of the transmission filter unit 50T and the terminal 67e, the terminal 67a1 is connected to an input terminal of the transmission filter 40A, the terminal 67d1 is connected to an output terminal of the transmission filter 40A, the terminal 67a2 is connected to an input terminal of the transmission filter 40B, and the terminal 67d2 is connected to an output terminal of the transmission filter 40B. The terminal 67c is put into a conductive state with one of the terminals 67f, 67g, and 67h, and the terminal 67c and the terminals 67f, 67g, and 67h form a SP3T switch. In addition, the terminals 67a1 and 67a2 and the terminal 67b form a SPDT switch, and the terminals 67d1 and 67d2 and the terminal 67e form a SPDT switch. That is, the switching circuit 67 has one SP3T switch and two SPDT switches. Note that the terminals 67g and 67h may be omitted.

With the configuration described above, for example, in a case where a radio frequency signal of the channel A of the first subband (Band 71A) and a radio frequency signal of the channel D of the first subband (Band 71A) are to be simultaneously transmitted, the terminal 67a1 is electrically connected to the terminal 67b, the terminal 67d1 is electrically connected to the terminal 67e, and the terminal 67c is not electrically connected to the terminal 67f, so that radio frequency signals outputted from the transmission amplifier 20 pass through the transmission filter 40A and enter the transmission filter unit 50T. Moreover, for example, in a case where a radio frequency signal of a channel C of the second subband (Band 71B) and a radio frequency signal of a channel F of the second subband (Band 71B) are to be simultaneously transmitted, the terminal 67a2 is electrically connected to the terminal 67b, the terminal 67d2 is electrically connected to the terminal 67e, and the terminal 67c is not electrically connected to the terminal 67f, so that radio frequency signals outputted from the transmission amplifier 20 pass through the transmission filter 40B and enter the transmission filter unit 50T. Moreover, in a case where a radio frequency signal of one of the channels of the communication band I (Band 71) is to be transmitted by itself, the terminals 67a1 and 67a2 are not electrically connected to the terminal 67b, the terminals 67d1 and 67d2 are not electrically connected to the terminal 67e, and the terminal 67c is electrically connected to the terminal 67f, so that a radio frequency signal outputted from the transmission amplifier 20 bypasses the transmission filters 40A and 40B and enters the transmission filter unit 50T.

According to this, in a case where radio frequency signals of two channels of the first subband (Band 71A) are simultaneously transmitted, a decrease in the reception sensitivity can be suppressed by routing the radio frequency signals through the transmission filter 40A even in a case where, for example, the frequency of the fifth order intermodulation distortion (IMD5) is included in the reception bandwidth. Moreover, in a case where radio frequency signals of two channels of the second subband (Band 71B) are simultaneously transmitted, a decrease in the reception sensitivity can be suppressed by routing the radio frequency signals through the transmission filter 40B even in a case where, for example, the frequency of the fifth order intermodulation distortion (IMD5) is included in the reception bandwidth.

Moreover, in a case where radio frequency signals of two channels of the first subband (Band 71A) are to be simultaneously transmitted, emission of a spurious signal from the antenna circuit 2 can be suppressed by routing the radio frequency signals through the transmission filter 40A even in a case where, for example, the frequency of the third order intermodulation distortion (IMD3) is included in the transmission bandwidth of the communication band I (Band 71), the spurious signal being caused by the third order intermodulation distortion (IMD3) occurring outside the first subband (Band 71A) and inside the second subband (Band 71B). Moreover, in a case where radio frequency signals of two channels of the second subband (Band 71B) are to be simultaneously transmitted, emission of a spurious signal from the antenna circuit 2 can be suppressed by routing the radio frequency signals through the transmission filter 40B even in a case where the frequency of intermodulation distortion is included in the transmission bandwidth of the communication band I (Band 71), the spurious signal being caused by intermodulation distortion occurring outside the second subband (Band 71B) and inside the first subband (Band 71A).

In addition, in a case where radio frequency signals of two channels of the communication band I (Band 71) are not to be simultaneously transmitted and a radio frequency signal of one of the channels is to be transmitted by itself, the input terminals of the transmission filters 40A and 40B are disconnected from the transmission amplifier 20, and the output terminals of the transmission filters 40A and 40B are disconnected from the transmission filter unit 50T. Thus, when viewed from the transmission amplifier 20 and the transmission filter unit 50T, the transmission filters 40A and 40B are in an open state, and thus the leakage of a radio frequency signal outputted from the transmission amplifier 20 into the transmission filters 40A and 40B can be suppressed. Thus, in a case where a radio frequency signal of one of the channels is to be transmitted by itself, the propagation loss of the radio frequency signal can be suppressed as much as possible.

As described above, a case of simultaneous communication with 4G (DC) is also expected in 5G (NR) communication standards. For example, a case occurs in which intermodulation distortion is caused in a reception bandwidth and a transmission bandwidth of a 5G communication band by a plurality of simultaneously transmitted radio frequency signals, and the reception sensitivity is degraded and the transmission signals do not meet spurious standards (spurious emission mask (SEM) requirements).

Here, there is no problem if the intermodulation distortion described above is sufficiently attenuated by the multiplexer (duplexer) connected to the antenna circuit 2; however, the amount of attenuation required for radio frequency front end modules is about −90 dB, and it is not realistic for small-sized multiplexers (duplexers) designed for terminal devices to realize the required amount of attenuation. Thus, under current circumstances, the imposing of a restriction on transmission power, which can be handled by the DC technology, (maximum power reduction (MPR)) and the admitting of the degradation of reception sensitivity to some extent (maximum sensitivity degradation (MSD)) are being planned to set in the official standards. For MPR/MSD, 10 dB or more are expected to be applied; however, the 5G/4G communication area may be made smaller in that case.

In contrast to this, with the radio frequency front end modules and communication devices according to the first and second embodiments, intermodulation distortion caused by radio frequency signals of two different channels in the same communication band can be sufficiently attenuated by the transmission filters 40, 41, 40A, and 40B arranged in front of the multiplexer (duplexer) connected to the antenna circuit 2, and thus there is no need to apply MPR/MSD excessively and it is possible to increase the communication area.

Furthermore, a bypass function is added to a communication-band selection switching circuit provided in a radio frequency front end module, and thus in a case where radio frequency signals of two different channels in the same communication band are not to be simultaneously transmitted, an unnecessary increase in current consumption can be suppressed by preventing the propagation loss due to a transmission filter from increasing.

In addition, even in a case where radio frequency signals of two different channels in the same communication band are to be simultaneously transmitted, although the propagation loss due to a transmission filter occurs (about 1 to 2 dB), when comparing with a case where a transmission filter is not used and the MPR is 10 dB or higher, the permissible output of a radio frequency transmission signal can be increased.

Other Embodiments

The radio frequency front end modules and communication devices according to the embodiments have been described above taking for example the first and second embodiments and the modifications of the first embodiment; however, the radio frequency front end modules and communication devices according to the present disclosure are not limited to the above-described embodiments and modifications. The present disclosure also includes other embodiments realized by combining arbitrary structural elements in the above-described embodiments and modifications, modifications obtained by adding, to the embodiments and modifications described above, various types of changes that can be conceived by those skilled in the art within the scope not departing from the gist of the present disclosure, and various types of devices in which a radio frequency front end module and a communication device according to the present disclosure are built.

Note that the radio frequency front end modules and communication devices according to the first and second embodiments are applied to, for example, communication systems based on, for example, the 3GPP standards. The communication band I and the communication band II, which are described in the first embodiment and its modifications, are applied to, for example, the individual LTE bands.

In addition, the frequencies of intermodulation distortion due to two radio frequency transmission signals (Tx1 and Tx2) typically include $3f_{Tx1}-2f_{Tx2}$, $2f_{Tx2}-2f_{Tx1}$, $2f_{Tx1}-f_{Tx2}$, $2f_{Tx2}-f_{Tx1}$, $f_{Tx1}-f_{Tx2}$, and $f_{Tx2}-f_{Tx1}$; however, the frequencies are not limited to these and also include those defined by $mf_{Tx1}\pm nf_{Tx2}$ and $mf_{Tx2}\pm nf_{Tx1}$ (m and n are natural numbers).

In addition, the structure of CA in which two different communication channels are simultaneously used is illustrated in the embodiments and modifications described above; however, the structures of the radio frequency front end modules and communication devices according to the present disclosure can be applied to the structure of CA in which three or more different communication channels are simultaneously used. That is, the present disclosure also includes a radio frequency front end module or a communication device configured to execute CA in which three or more different communication channels are simultaneously used and having a configuration including the configuration of a radio frequency front end module or a communication device according to the embodiments and modifications described above.

In addition, for example, in the radio frequency front end modules and communication devices according to the embodiments and modifications described above, other radio frequency circuit elements and wiring lines and so forth may be inserted midway along the paths that connects the circuit elements and the signal paths disclosed in the drawings.

In addition, in the radio frequency front end modules and communication devices according to the embodiments and modifications described above, "A and B are connected to each other" includes not only a form in which A and B are directly connected to each other without any other radio frequency circuit element interposed therebetween but also a form in which A and B are indirectly connected to each other, for example, with a passive circuit formed by an inductor and a capacitor or a switching circuit interposed therebetween.

The present disclosure can be widely used as a multiband/multimode front end module using a carrier aggregation scheme in communication devices such as mobile phones.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A radio frequency front end module configured to simultaneously transmit a first radio frequency signal of a first communication channel and a second radio frequency signal of a second communication channel, the second communication channel having a different frequency than the first communication channel, the first and second communication channels being in a communication band, the communication band comprising a first subband, a second subband, and a plurality of communication channels, the second subband being a different frequency band than the first subband and overlapping the first subband, the radio frequency front end module comprising:
  a common terminal;
  a power amplifier to which the first radio frequency signal and the second radio frequency signal are simultaneously input;
  a multiplexer comprising a transmission filter connected to the common terminal and a reception filter connected to the common terminal, the transmission filter having a pass band comprising a transmission band of the communication band, and the reception filter having a pass band comprising a reception band of the communication band;
  a first transmission filter arranged between an output terminal of the power amplifier and an input terminal of the transmission filter of the multiplexer, the first transmission filter having a pass band comprising a transmission band of the first subband, and having an attenuation band comprising a reception band of the first subband;

a second transmission filter arranged between the output terminal of the power amplifier and the input terminal of the transmission filter of the multiplexer, the second transmission filter having a pass band comprising a transmission band of the second subband, and having an attenuation band comprising a reception band of the second subband; and a first switching circuit arranged between the power amplifier and the transmission filter of the multiplexer, the first switching circuit being configured to selectively connect the power amplifier and the multiplexer to the first transmission filter when the first radio frequency signal and the second radio frequency signal are simultaneously transmitted and the first and second communication channels are in the first subband, and configured to selectively connect the power amplifier and the multiplexer to the second transmission filter when the first radio frequency signal and the second radio frequency signal are simultaneously transmitted and the first and second communication channels are in the second subband.

2. The radio frequency front end module according to claim 1, wherein:

the attenuation band of the first transmission filter further comprises a band obtained by eliminating the first subband from the frequency band of the communication band, and the attenuation band of the second transmission filter further comprises a band obtained by eliminating the second subband from the frequency band of the communication band.

3. The radio frequency front end module according to claim 1, wherein the first radio frequency signal and the second radio frequency signal are of different communication standards.

4. The radio frequency front end module according to claim 3, wherein:

the first radio frequency signal is a 4th generation mobile communication system (4G) signal, the second radio frequency signal is a 5th generation mobile communication system (5G), and the first and second radio frequency signals are simultaneously transmitted using Dual Connectivity.

5. The radio frequency front end module according to claim 1, wherein:

the transmission band of the communication band is of a Third Generation Partnership Project (3GPP) standards, and the reception band of the communication band is of the 3GPP standard.

6. The radio frequency front end module according to claim 1, further comprising:

a second switching circuit connected to the output terminal of the power amplifier and the input terminal of the transmission filter of the multiplexer, and configured to selectively connect a bypass between the output terminal of the power amplifier and the input terminal of the transmission filter of the multiplexer.

7. A communication device comprising:

the radio frequency front end module according to claim 1; and a radio frequency signal processing circuit configured to simultaneously transmit the first radio frequency signal and the second radio frequency signal.

* * * * *